United States Patent
Phan et al.

(10) Patent No.: US 12,066,813 B2
(45) Date of Patent: Aug. 20, 2024

(54) PREDICTION AND OPERATIONAL EFFICIENCY FOR SYSTEM-WIDE OPTIMIZATION OF AN INDUSTRIAL PROCESSING SYSTEM

(71) Applicant: International Business Machines Corporation, Armonk, NY (US)

(72) Inventors: Dzung Tien Phan, Pleasantville, NY (US); Long Vu, Chappaqua, NY (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 17/696,840

(22) Filed: Mar. 16, 2022

(65) Prior Publication Data
US 2023/0297073 A1 Sep. 21, 2023

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/31449* (2013.01)

(58) Field of Classification Search
CPC ...... G05B 19/4155; G05B 2219/31449; G05B 2219/25255; G05B 2219/32335; G05B 2219/33027; G05B 13/0265; G05B 13/027; G06N 20/00; G06N 20/20; G06N 5/01; G06N 3/0455; G06N 3/048; G06N 3/088
See application file for complete search history.

(56) References Cited

U.S. PATENT DOCUMENTS 6,278,899 B1   8/2001 Piche
7,966,087 B2   6/2011 Kokotov
(Continued)

FOREIGN PATENT DOCUMENTS

| CN | 101727622 A | 6/2010 |
| CN | 106485353 A | 3/2017 |
| CN | 106875511 A | 6/2017 |
| CN | 107730029 A | 2/2018 |

(Continued)

OTHER PUBLICATIONS

ZhongYu Liu, Deep and Simple Graph Neural Network: GNN Principle Analysis. Machinery Industry Press. Jan. 1, 2020, pp. 70-73 (English translation not readily available, relevance believed apparent from math symbols).
(Continued)

*Primary Examiner* — Chad G Erdman
(74) *Attorney, Agent, or Firm* — Nicholas Welling; Otterstedt & Kammer PLLC

(57) ABSTRACT

A relationship between an input, a set-point of a plurality of processes and an output of a corresponding process is learned using machine learning. A regression function is derived for each process based upon historical data. An autoencoder is trained for each process based upon the historical data to form a regularizer and the regression functions and regularizers are merged together into a unified optimization problem. System level optimization is performed using the regression functions and regularizers and a set of optimal set-points of a global optimal solution for operating the processes is determined. An industrial system is operated based on the set of optimal set-points.

20 Claims, 14 Drawing Sheets

(56) References Cited

U.S. PATENT DOCUMENTS

| | | |
|---|---|---|
| 11,055,639 B1 | 7/2021 | Cay |
| 2018/0095936 A1 | 4/2018 | Bonnecaze |
| 2021/0264290 A1 | 8/2021 | Murali |
| 2022/0012640 A1 | 1/2022 | Iyengar |
| 2022/0012641 A1 | 1/2022 | Iyengar |
| 2022/0027685 A1* | 1/2022 | Phan ............... G06N 20/00 |
| 2022/0057786 A1 | 2/2022 | Phan |
| 2022/0058515 A1 | 2/2022 | Phan |
| 2023/0028276 A1* | 1/2023 | Yakut ............... G06N 3/044 |

FOREIGN PATENT DOCUMENTS

| | | |
|---|---|---|
| CN | 112015153 A | 12/2020 |
| CN | 112826459 A | 5/2021 |
| CN | 113065649 A | 7/2021 |
| CN | 114168583 A | 3/2022 |
| CN | 114170474 A | 3/2022 |
| JP | 52882712 A | 11/2010 |
| KR | 1018467931 A | 10/2017 |
| WO | 2021197783 W | 10/2021 |

OTHER PUBLICATIONS

China National Intellectual Property Administration, counterpart PCT PCT/CN2023/076184, ISR & WO, May 29, 2023. pp. 13.

Wilder, Bryan et al. Melding the data-decisions pipeline: Decision-focused learning for combinatorial optimization. InProceedings of the AAAI Conference on Artificial Intelligence Jul. 17, 2019 (vol. 33, No. 01, pp. 1658-1666).

Elmachtoub, Adam et al. Decision trees for decision-making under the predict-then-optimize framework. InInternational Conference on Machine Learning Nov. 21, 2020 (pp. 1-10). PMLR.

Subramanian, Dharmashankar et al. A prediction-optimization framework for site-wide process optimization. In2019 IEEE International Congress on Internet of Things (ICIOT) Jul. 8, 2019 (pp. 125-132). IEEE.

Lombardi, Michele et al. Empirical decision model learning. Artificial Intelligence. Mar. 1, 2017;244:343-67.

Phan, Dzung T. et al. Regression Optimization for System-level Production Control. In2021 American Control Conference (ACC) May 25, 2021 (Pre-print 1-6).

Peter Mell and Timothy Grance, The NIST Definition of Cloud Computing, NIST Special Publication 800-145, Sep. 2011, cover, pp. i-iii and 1-3.

Dzung Tien Phan et al., unpublished U.S. Appl. No. 17/330,363, filed May 25, 2021, pp. 1-35 plus 16 sheets drawings.

Dzung Tien Phan et al., unpublished U.S. Appl. No. 17/550,551, filed Dec. 14, 2021, pp. 1-30 plus 8 sheets drawings.

Chemcad NXT, downloaded via web.archive.org for https://www.chemstations.com for Mar. 13, 2022. (pp. 1-6).

* cited by examiner

PREDICTION AND OPERATIONAL EFFICIENCY FOR SYSTEM-WIDE OPTIMIZATION OF AN INDUSTRIAL PROCESSING SYSTEM

BACKGROUND

The present invention relates to the electrical, electronic and computer arts, and more specifically, to industrial processing systems.

Conventional industrial processing systems, such as systems used for crude oil production, perform site-wide optimization to improve efficiency and performance. The various processes of the system, such as extraction processes, upgrading processes, and the like, are used to process crude oil and often use intermediate storage tanks between processes. The output of the process is, for example, kerosene (jet fuel). The main inputs to the plant are crude oil, water, and the like. The intermediate products and byproducts produced by each process are stored in the inter-staging tanks. A network of multiple plants (processes) is designed where each process has a set of inputs and outputs. The outflow from an upstream process becomes an inflow into a downstream process. In some example embodiments, a complex relationship exists between various set-points (such as temperature, voltage, and the like, of a process), material inflows, the throughput, and so forth, that are used to select the operating parameters of the system.

SUMMARY

Principles of the invention provide techniques for prediction and operational efficiency for system-wide optimization of an industrial processing system. In one aspect, an exemplary computer-implemented method includes the operations of learning, using machine learning, a relationship between an input and a set-point of a plurality of processes and an output of a corresponding process; deriving a regression function for each process based upon historical data; training an autoencoder for each process based upon the historical data to form a regularizer; merging the regression functions and regularizers together into a unified optimization problem; performing system level optimization using the regression functions and regularizers; determining a set of optimal set-points of a global optimal solution for operating the processes; and operating an industrial system based on the set of optimal set-points.

In one aspect, an apparatus comprises a memory and at least one processor, coupled to the memory, and operative to perform operations comprising learning, using a machine learning model generator, a relationship between an input and a set-point of a plurality of processes and an output of a corresponding process; deriving, using the machine learning model generator, a regression function for each process based upon historical data; training an autoencoder of an optimization model creator for each process based upon the historical data to form a regularizer; merging, using the optimization model creator, the regression functions and regularizers together into a unified optimization problem; performing, using an optimizer, system level optimization using the regression functions and regularizers; determining, using the optimizer, a set of optimal set-points of a global optimal solution for operating the processes; and operating an industrial system based on the set of optimal set-points.

In one aspect, a computer program product comprises a computer readable storage medium having program instructions embodied therewith, the program instructions executable by a computer to cause the computer to perform operations comprising learning, using machine learning, a relationship between an input and a set-point of a plurality of processes and an output of a corresponding process; deriving a regression function for each process based upon historical data; training an autoencoder for each process based upon the historical data to form a regularizer; merging the regression functions and regularizers together into a unified optimization problem; performing system level optimization using the regression functions and regularizers; determining a set of optimal set-points of a global optimal solution for operating the processes; and operating an industrial system based on the set of optimal set-points.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

- mitigation of inaccuracies in machine learning models for learning industrial processing systems to get a high-quality decision-making solution;
- ability to turn-off inefficient processes;
- strategies for relaxing operational limits in order to determine a feasible operating set-point;
- techniques for handling processes defined by nonlinear functions;
- techniques that improve computer performance (shorter running time) in finding a high-quality operating set-point, and
- improved performance and efficiency of industrial processing systems.

These and other features and advantages of the present invention will become apparent from the following detailed description of illustrative embodiments thereof, which is to be read in connection with the accompanying drawings.

DETAILED DESCRIPTION

Figure 1:
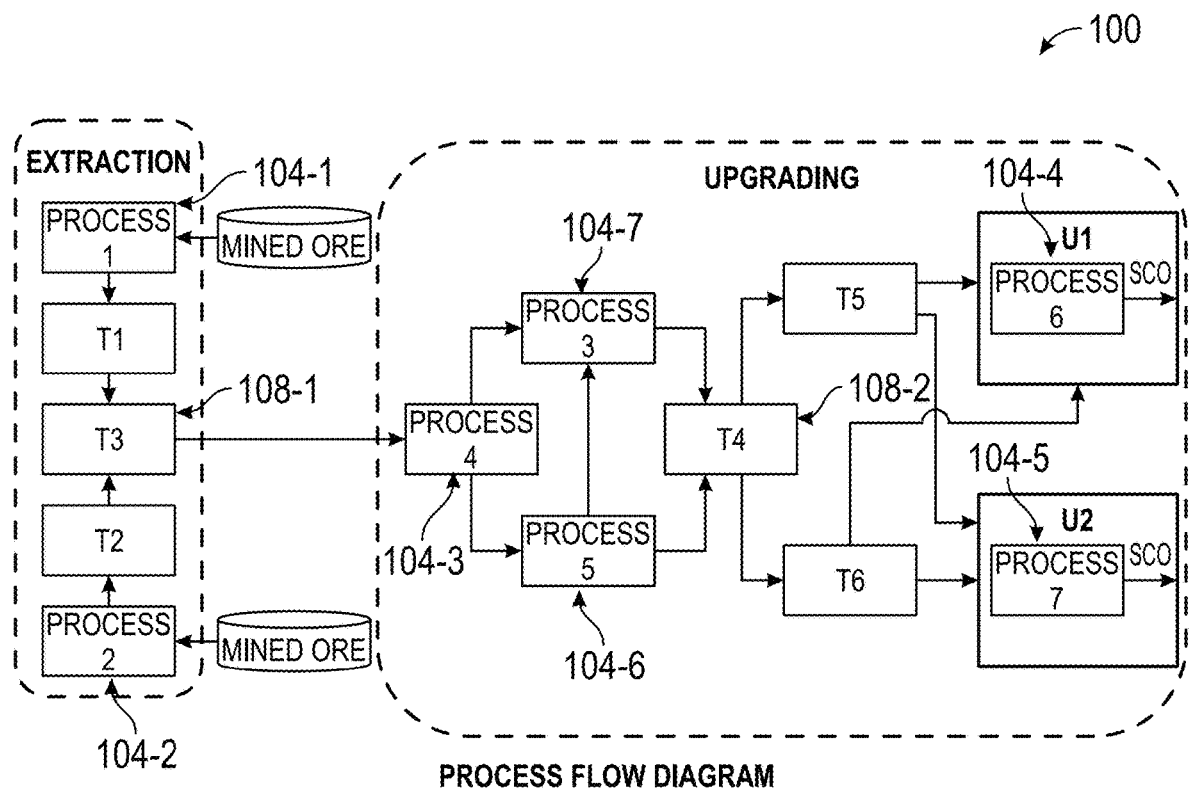
FIG. 1 illustrates an example process flow diagram and a corresponding time-indexed graphical representation for a multi-period site-wide regression optimization for production of a finished product, in accordance with an example embodiment.
Figure 1:
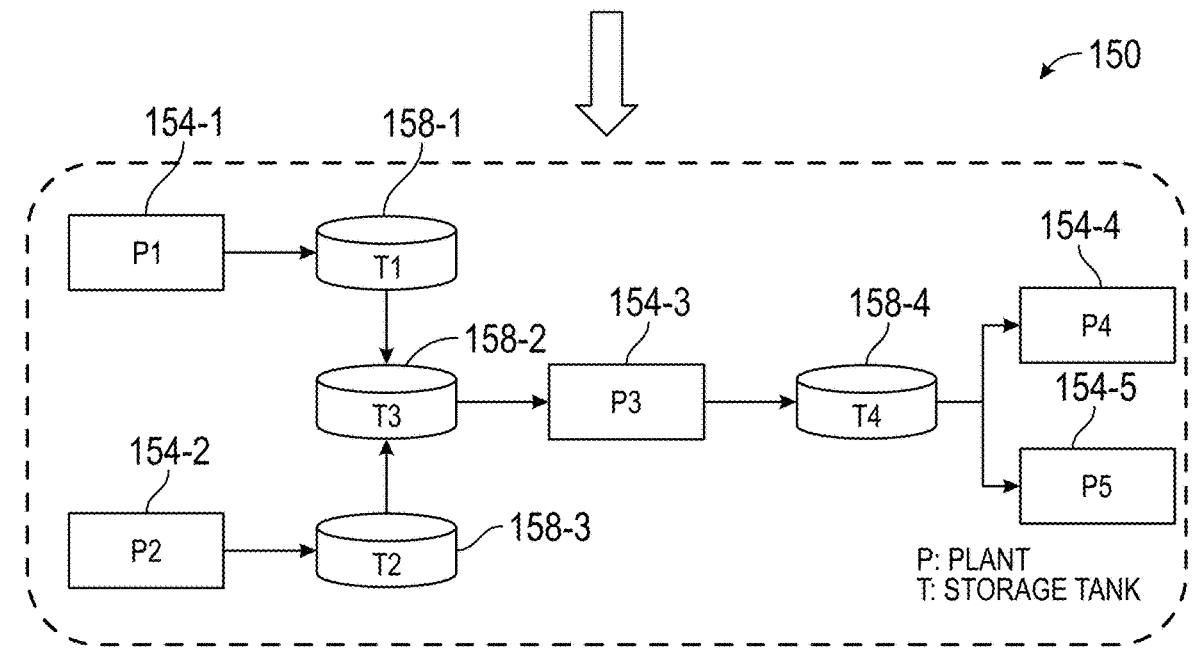

In general, an optimization framework, systems, and methods for decision-making in industrial process systems, such as manufacturing, are disclosed. Data and artificial intelligence (AI) are used to derive process and system decisions more efficiently and effectively to, for example, generate operational set-point recommendations for a process plant. FIG. 1 illustrates an example process flow diagram 100 and a corresponding time-indexed graphical representation 150 for a multi-period site-wide regression optimization for production of a finished product, in accordance with an example embodiment. In one example embodiment, various processes, such as a primary extraction process 104-1, 104-2, a secondary process 104-3, a first upgrading process 104-4 and a second upgrading process 104-5, are used to process a raw material where storage is available via tanks 108-1, 108-2. Each plant (processes 104-1, 104-2, 104-4, 104-5) of a network of multiple plants has a set of inputs and outputs. The outflow from an upstream process 104-1, 104-2, 104-3 becomes an inflow into a downstream process 104-3, 104-4, 104-5. In some example embodiments, a complex relationship exists between various set-points (such as utility water flow rate, mixing speed, temperature, input flow rate of mined ore, and the like), and the like of a process 104-1, 104-2, 104-3, 104-4, 104-5, 104-6, 104-7), material inflows, the throughput, and the like. A system-wide control problem is defined to identify, for example, the operating set-points for each process 104-1, 104-2, 104-3, 104-4, 104-5, 104-6, 104-7 to optimize the system 100.

The time-indexed graphical representation 150 represents, for example, each process 104-1, 104-2, 104-3, 104-4, 104-5, tank 108-1, 108-2, and the like, as well as the connectivity and other relationships between these elements. For example, processes 154-1, 154-2, 154-4, 154-5 represent processes 104-1, 104-2, 104-4, 104-5, respectively, process 154-3 represents the combination of processes 104-3, 104-6, 104-7, tanks 158-1, 158-2, 158-3 represent tank 108-1 and tank 158-4 represents tank 108-2.

Figure 2:
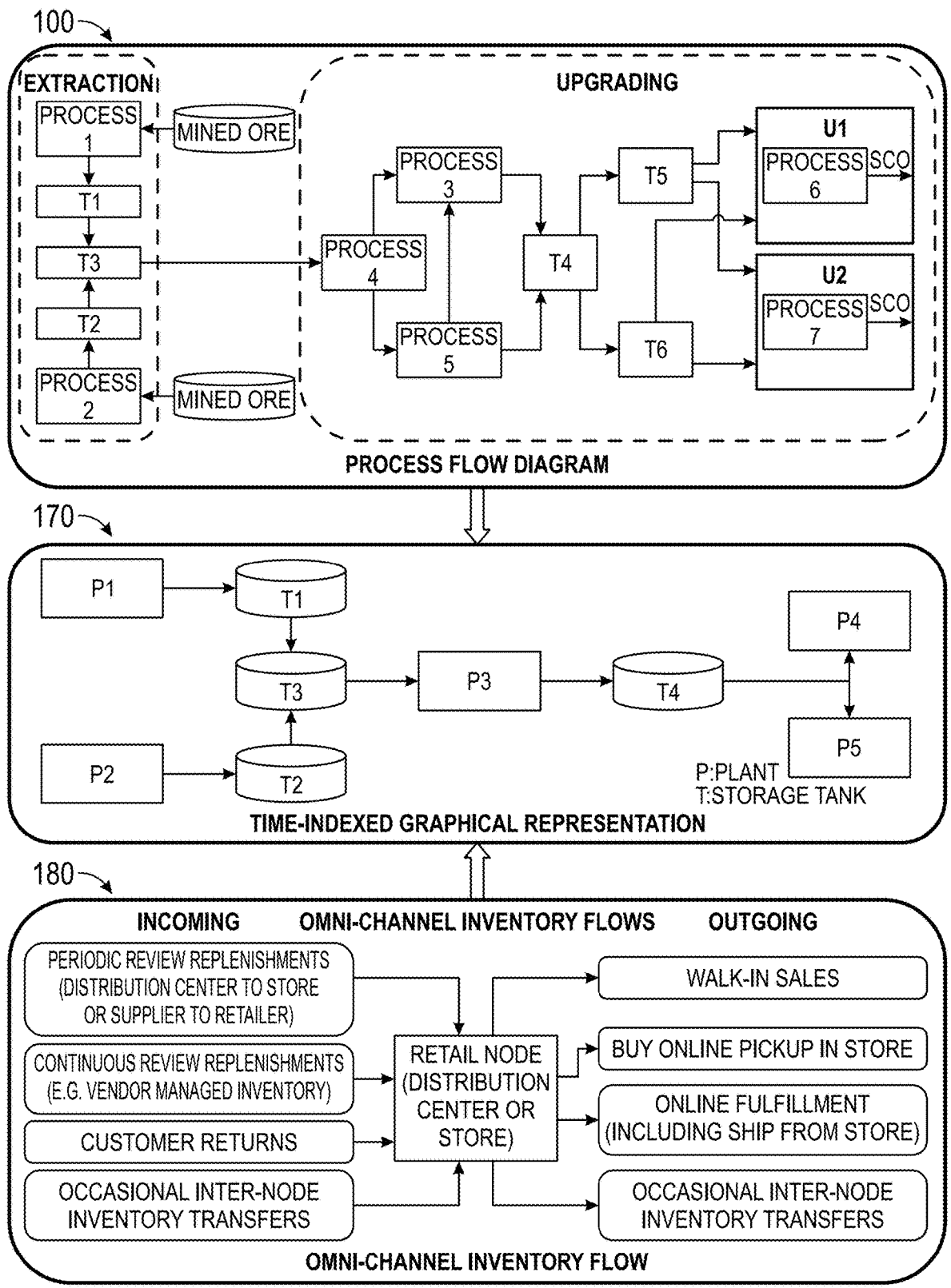
FIG. 2 illustrates an example process flow diagram and an example of omni-channel inventory flow representation, and a corresponding time-indexed graphical representation for a multi-period site-wide regression optimization for finished product production, in accordance with an example embodiment.

FIG. 2 illustrates an example process flow diagram 100 and an example of an omni-channel inventory flow representation 180, and a corresponding time-indexed graphical representation 170 for a multi-period site-wide regression optimization for finished product production from the process flow, in accordance with an example embodiment. Similar, to the time-indexed graphical representation 150, the time-indexed graphical representation 170 represents, for example, each process 104-1, 104-2, 104-3, 104-4, 104-5, tank 108-1, 108-2 and the like, as well as the connectivity and other relationships between the elements of the process flow diagram 100. In addition, the time-indexed graphical representation 170 incorporates other aspects, such as the omni-channel inventory flow, to reflect inventory demands and the like. In one example embodiment, machine learning is used for optimizing the processes 104-1, 104-2, 104-3, 104-4, 104-5 in terms, for example, of throughput, shipping costs, and the like to learn set-points, flows, and the like for the process flow diagram 100.

Figure 3:
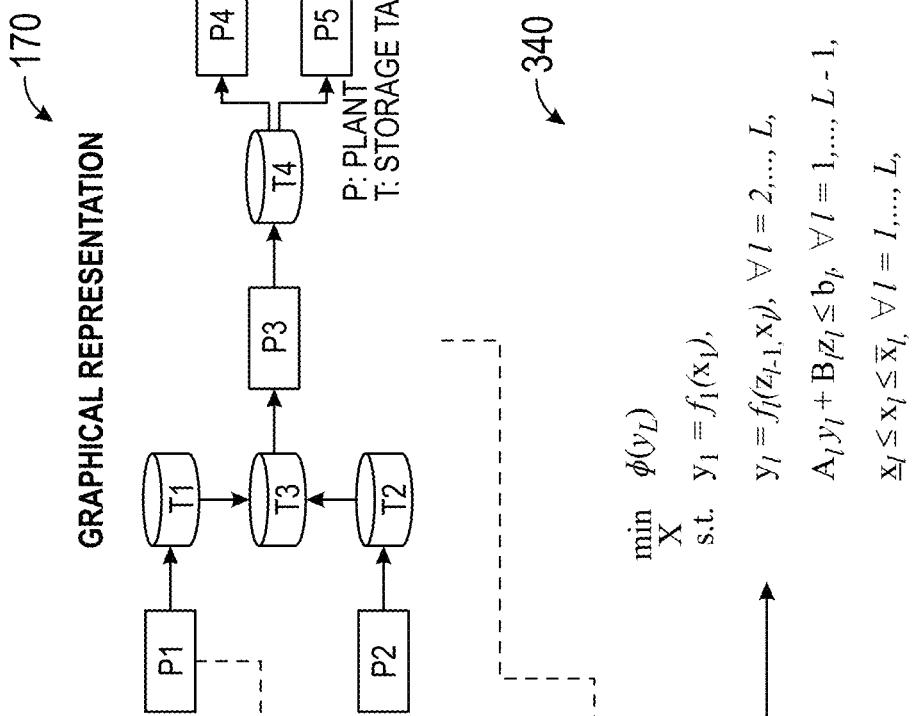
FIG. 3 represents an example regression-optimization pipeline, in accordance with an example embodiment.
Figure 3:
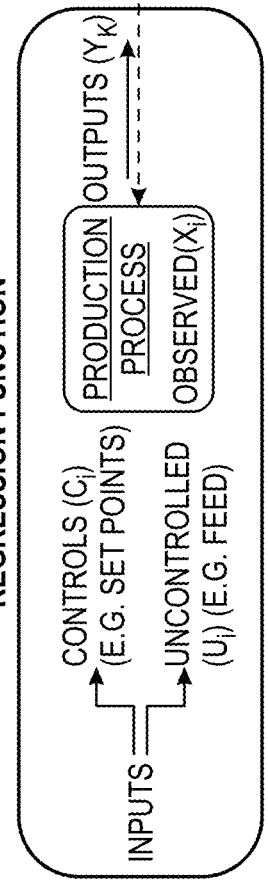
Figure 3:
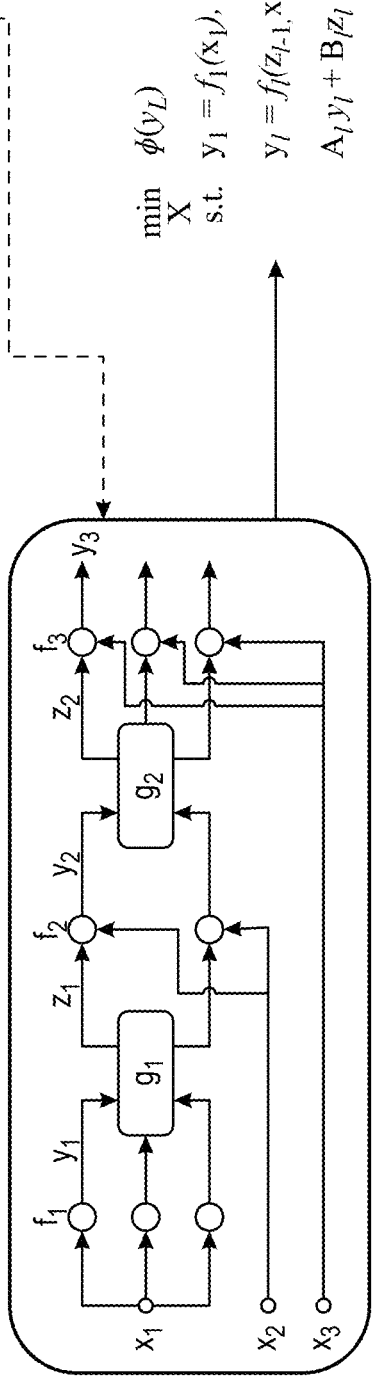

FIG. 3 represents an example regression-optimization pipeline, in accordance with an example embodiment. In one example embodiment, machine learning is used to learn the relationship between the input to, and set-point of, each process 104-1, 104-2, 104-3, 104-4, 104-5, 104-6, 104-7 and the output of the corresponding process 104-1, 104-2, 104-3, 104-4, 104-5, 104-6, 104-7. For example, machine learning is used to learn the relationship between the input, the set-point, and the output of the process 104-1. In particular, regression function $f_1$ gives the relationship between the set-point $x_1$ and the output $y_1$ for each instance of the process 104-1. Regression functions are derived for each process 104-1, 104-2, 104-3, 104-4, 104-5, 104-6, 104-7 and merged together into a single optimization problem 340 to derive a set of set-points for the plant. In one example embodiment, the machine learning uses historical data for each function that relates the output of the corresponding process 104-1, 104-2, 104-3, 104-4, 104-5, 104-6, 104-7 to the corresponding input and set-point.

Generalized network representation 320 illustrates a regression representation for a three-layer network of processes and intermediate storage facilities, such as tanks, buffers, and the like. Regression functions $f_i$ give the relationship between the set-point $x_i$ (primary controllable variable) and the output $y_i$ (state variable) for the process i. Each storage unit is represented by $g_i$ (which acts as a constraint for y and z) and $z_i$ (secondary controllable variable) represents the flow from storage unit i to another entity. The equations of the optimization problem 340 illustrate the development of the optimization model for the entire system 170, where $A_l$, $B_l$, $b_l$, $\underline{x}_l$, $\bar{x}_l$ are operational constraints. (It is noted that, in FIG. 3, each process i is replicated such that, for example, process 1 is represented by three nodes (three processes) operating in parallel.)

Figure 4:
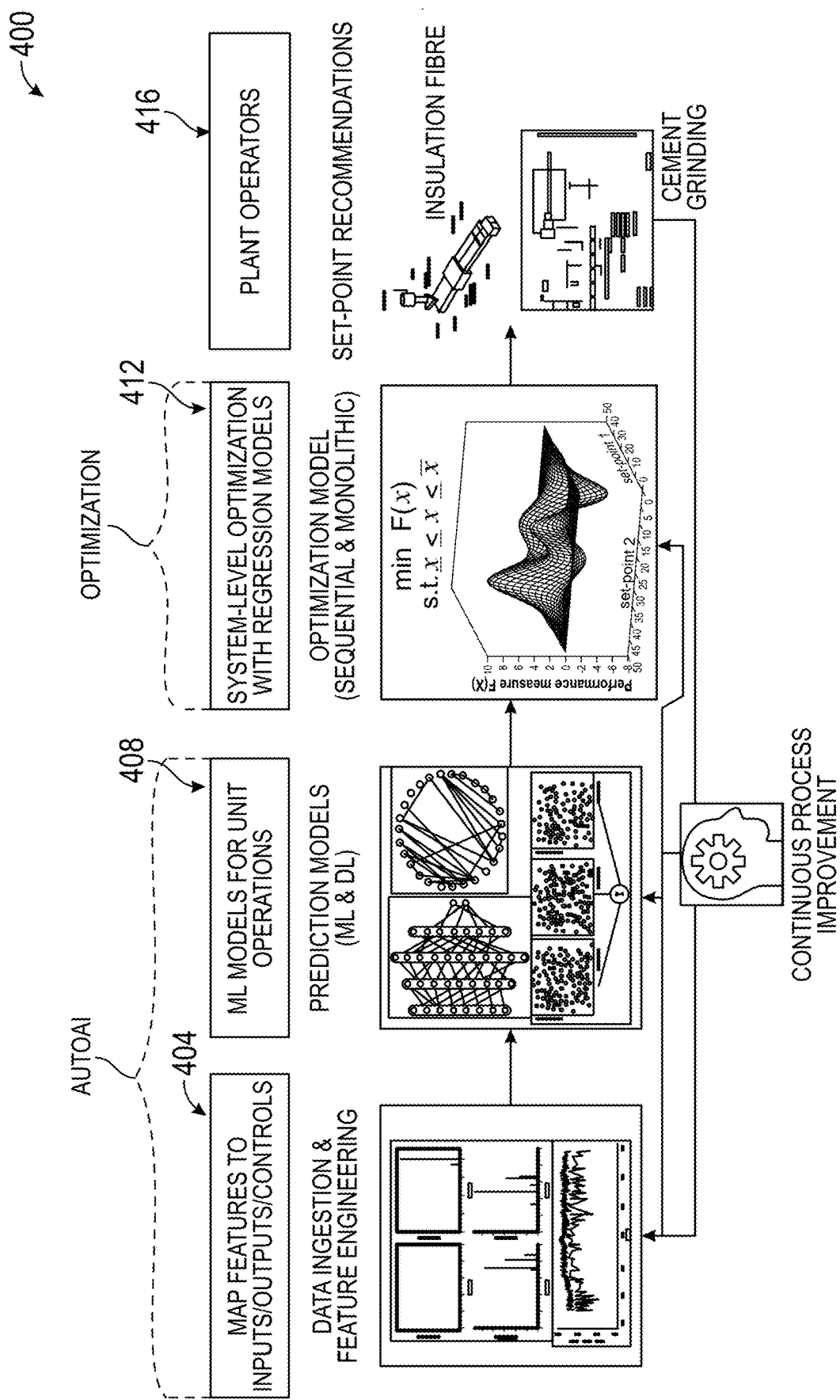
FIG. 4 illustrates an example workflow for a regression-optimization pipeline, in accordance with an example embodiment.

FIG. 4 illustrates an example workflow 400 for a regression-optimization pipeline, in accordance with an example embodiment. In one example embodiment, prediction models and the plants' operational constraints are used to form a system-wide optimization model and to derive an optimization algorithm for the decision-making problem. Data, such as historical data for each process 104-1, 104-2, 104-3, 104-4, 104-5, 104-6, 104-7 is ingested and feature engineering is performed for each process 104-1, 104-2, 104-3, 104-4, 104-5, 104-6, 104-7 (operation 404). The machine learning models for each process 104-1, 104-2, 104-3, 104-4, 104-5, 104-6, 104-7 are developed based on the results of the feature engineering (operation 408). System level optimization is performed using the regression models (operation 412) and mathematical programming, for which the optimal set-points for operating the processes 104-1, 104-2, 104-3, 104-4, 104-5, 104-6, 104-7 are determined and recommended (operation 416). Several issues dominate the regression-optimization pipeline:

a) How to handle prediction uncertainty to improve decision quality: conventional systems do not consider the intrinsic uncertainty in the prediction models. In one example embodiment, an improved optimization algorithm that navigates to an operating region exhibiting high prediction accuracy and that shuts down inefficient instances of a process 104-1, 104-2, 104-3, 104-4, 104-5, 104-6, 104-7 is disclosed.

b) How to handle plant efficiency and conflicting objectives and constraints: input parameters, such as conflicting objectives and constraints, can lead to an infeasible optimization problem where an optimal set-point cannot be derived. In one example embodiment, a technique for deriving an optimal set-point in an otherwise infeasible optimization problem is disclosed.

c) How to improve the quality of the solution for optimization: a highly non-convex optimization problem can lead to a sub-optimal solution. In one example embodiment, a technique for deriving an optimal set-point for a highly non-convex function in an optimization problem is disclosed.

I. Mitigating Model Inaccuracy

Figure 5:
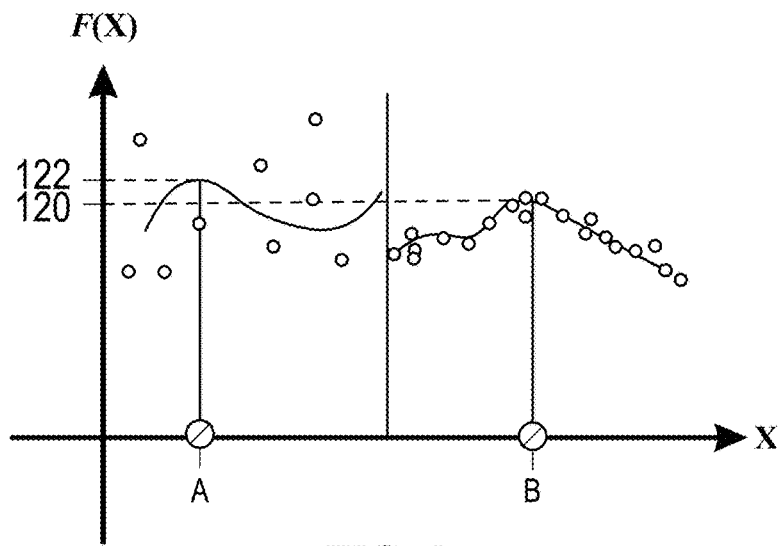
FIGS. 5 and 6 illustrate the fidelity of an example model, in accordance with an example embodiment.
Figure 6:
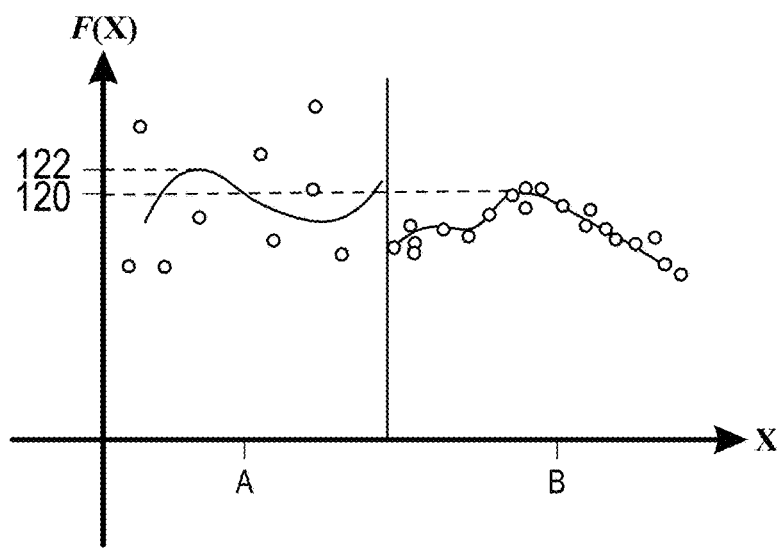
Figure 6:
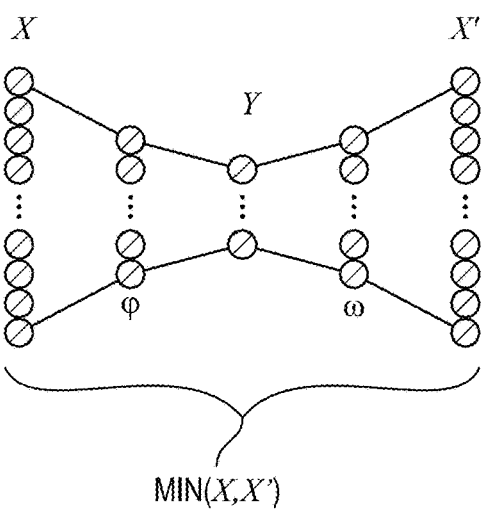

FIGS. 5 and 6 illustrate the prediction model fidelity of an example model, in accordance with an example embodiment. As illustrated in FIG. 5, the optimal operating point is in region A, where the objective function value is $f(x)=122$ gallons for process throughput. The predictions (represented by the curve learned from dots) in region A, however, are less accurate than the predictions in region B. Thus, a higher function value for $f(x)$ may lead to a poor decision, since the prediction accuracy around the optimal solution is low. The optimized solution in region B is trusted over that in region A as region B has more training points and higher prediction accuracy. In one example embodiment, the optimizer is designed to find a set-point in region B to mitigate the inaccuracy of the model. This is accomplished by adding a regularizer term to the optimization problem.

The representation power of a prediction model is limited by the historical data used. Hence, the prediction accuracy around the optimal decision point may be low if training samples around the solution are scarce or noisy. As an example, in FIG. 5, an optimal set-point derived from the region A is less reliable than a solution from the region B. A solution close to many training points is desirable. This requirement is generalized by examining the neighborhood of the decision point in an appropriate subspace by using autoencoders.

An autoencoder is a neural network, which is used to obtain a representation of the input feature vector $x \in \mathbb{R}^p$ in a lower-dimensional space $\mathbb{R}^d$. The autoencoder consists of two components, the encoder $\varphi: \mathbb{R}^p \to \mathbb{R}^d$ and the decoder $\omega: \mathbb{R}^d \to \mathbb{R}^p$, which can be defined as:

$$y = \varphi(x) \text{ and } x' = \omega(y), \text{ where } x, x' \in \mathbb{R}^p, y \in \mathbb{R}^d \text{ and } d < p$$

The objective function of the optimization problem is regularized with the autoencoder-based reconstruction error, corresponding to the optimizer $r(x) = \|x - \omega(\varphi(x))\|$ corresponding to the optimizer x. The optimal set-point is determined by solving the optimization problem $\max_{x \in \mathbb{R}^p} f(x) - \lambda r(x)$ for some $\lambda \geq 0$, where $f(x)$ is the prediction function.

This is an effective way to incentivize the optimizer to stay in the vicinity of the historical data manifold. This is because an autoencoder that is trained to minimize reconstruction error on historical data will likely induce lower reconstruction error in such vicinity. In particular, the reconstruction error is lower in the vicinity of sufficient historical data (such as sub-region B), thereby regularizing the optimizer to prefer such solutions where the various regression models also enjoy higher model fidelity due to data sufficiency. As illustrated in FIG. 6, the dataset is compressed and the set-point is imposed to be close to the historic data in a lower dimension space. For the autoencoder using ReLU feed-forward neural networks and the L1 norm reconstruction error, the regularizer $r(x)$ can be expressed within the framework of mixed-integer linear programming. The values 120, 122 are function values; for example, the number of gallons of process throughput.

II. Plant Efficiency and Conflicting Objectives and Constraints

In one example embodiment, the subset of the processes 104-1, 104-2, 104-3, 104-4, 104-5, 104-6, 104-7 that are inefficient are shut down while the more efficient subset of processes 104-1, 104-2, 104-3, 104-4, 104-5, 104-6, 104-7 are started up. Also, in addition to the option to shut down, the flow can be decreased and, in addition to the option to start up, the flow can be increased. In one example embodiment, a binary variable $v_l \in \{0,1\}$ is used to turn on and turn off a process 104-1, 104-2, 104-3, 104-4, 104-5, 104-6, 104-7. The start-up and shut-down costs are captured during optimization by the term:

$$\sum_{l \in \text{Offline Assets}} c_l^{up^T} v_l + \sum_{l \in \text{Offline Assets}} c_l^{down^T} (1 - v_l).$$

where $c_l^{up}$, $c_l^{down}$ are the cost of start up and shut down of the l-th process, respectively.

In addition, to address an infeasible optimization problem for a given set of desired operational constraint inputs, various constraints can be relaxed. For example, consider a temperature constraint $\underline{x}_l \leq x_l \leq \bar{x}_l$ represented by a new range $(\underline{x}_l - \Delta x_l) v_{l,G} \leq x_l \leq (\bar{x}_l + \Delta x_l) v_{l,G}, v_{l,G} \in \{0,1\} \forall l=1, \ldots, L$. $\Delta x_l$ enables a relaxation of the original constraint $(\underline{x}_l) v_{l,G} \leq x_l \leq (\bar{x}_l) v_{l,G}, \forall l=1, \ldots, L$, while ensuring that the set-point does not move beyond a point justified by the historical data. In addition, as described further below, operational violation costs are represented by $\Sigma_l (\|\Delta x_l\|_1 + \|\Delta z_l\|_1)$ and a predictive uncertainty regularizer is represented by $\Sigma_l r(x_l)$.

Highly Non-Convex Optimization Problems

It is noted that some regression functions $f(x)$ may be highly non-linear, making it difficult to find the optimal solution, such as the optimal set-points for the processes 104-1, 104-2, 104-3, 104-4, 104-5, 104-6, 104-7.

Figure 7A:
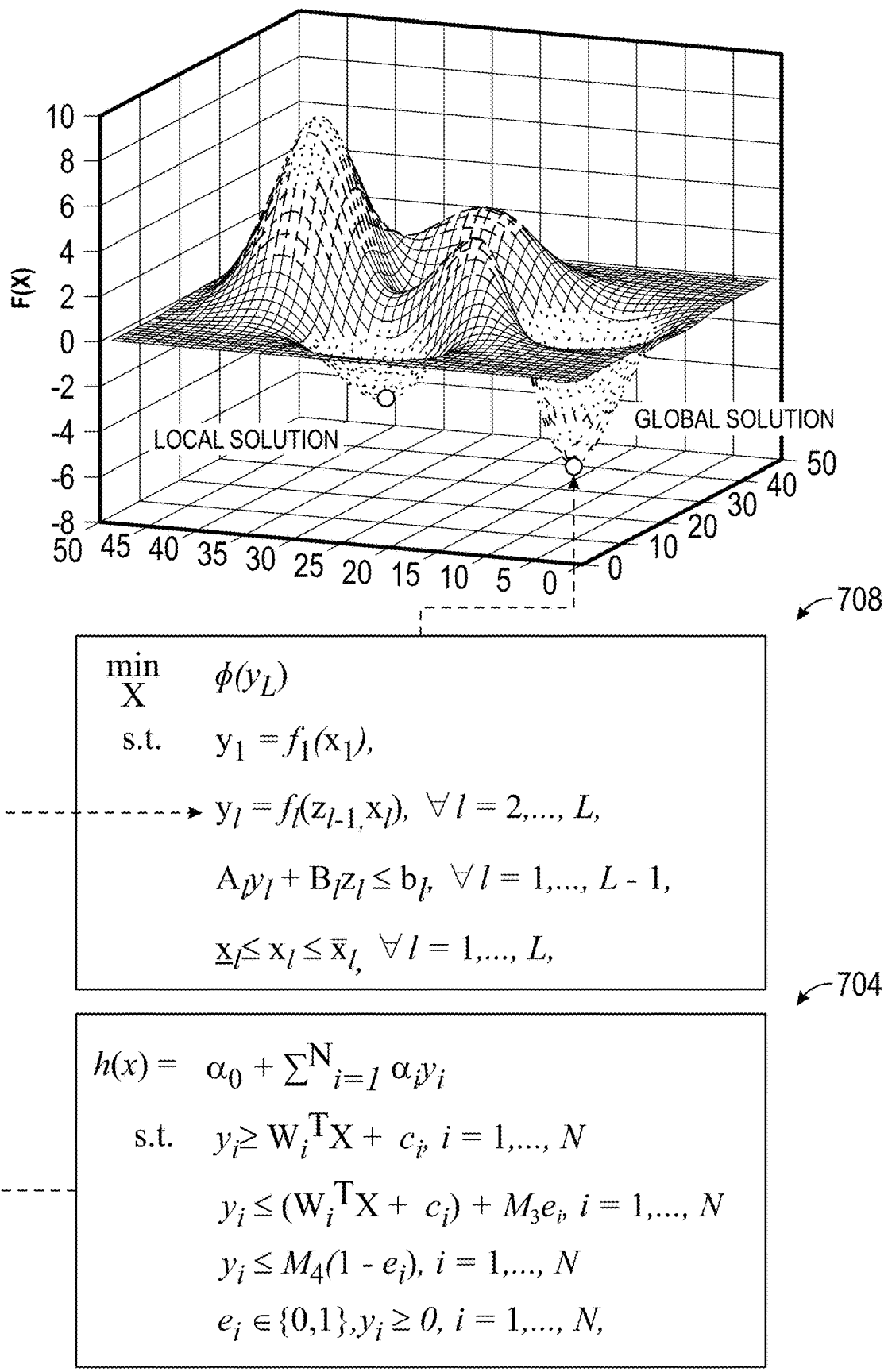
FIG. 7A illustrates an encoding of a regressive function as a mixed-integer linear programs (MILP) in order to find a globally optimal solution for the defined optimization problem, in accordance with an example embodiment.

FIG. 7A illustrates an encoding of a regressive function as a mixed-integer linear programs (MILP) in order to find a globally optimal solution for optimization problem 708, in accordance with an example embodiment. Elements 704, 708 are discussed below. In one example embodiment, a highly non-linear function $f(x)$ is handled in a substantially linear manner. For example, a multivariate adaptive regression spline (MARS) may be represented as:

$$f_i(x) = \alpha_0 + \Sigma_{i=1}^N \alpha_i h_i(x), h_i(x) = \max\{w_i^T x + c_i, 0\}$$

An exact MILP representation in 704 is used for $f_i(x)$ when it is plugged in the optimization problem 708.

Figure 7B:
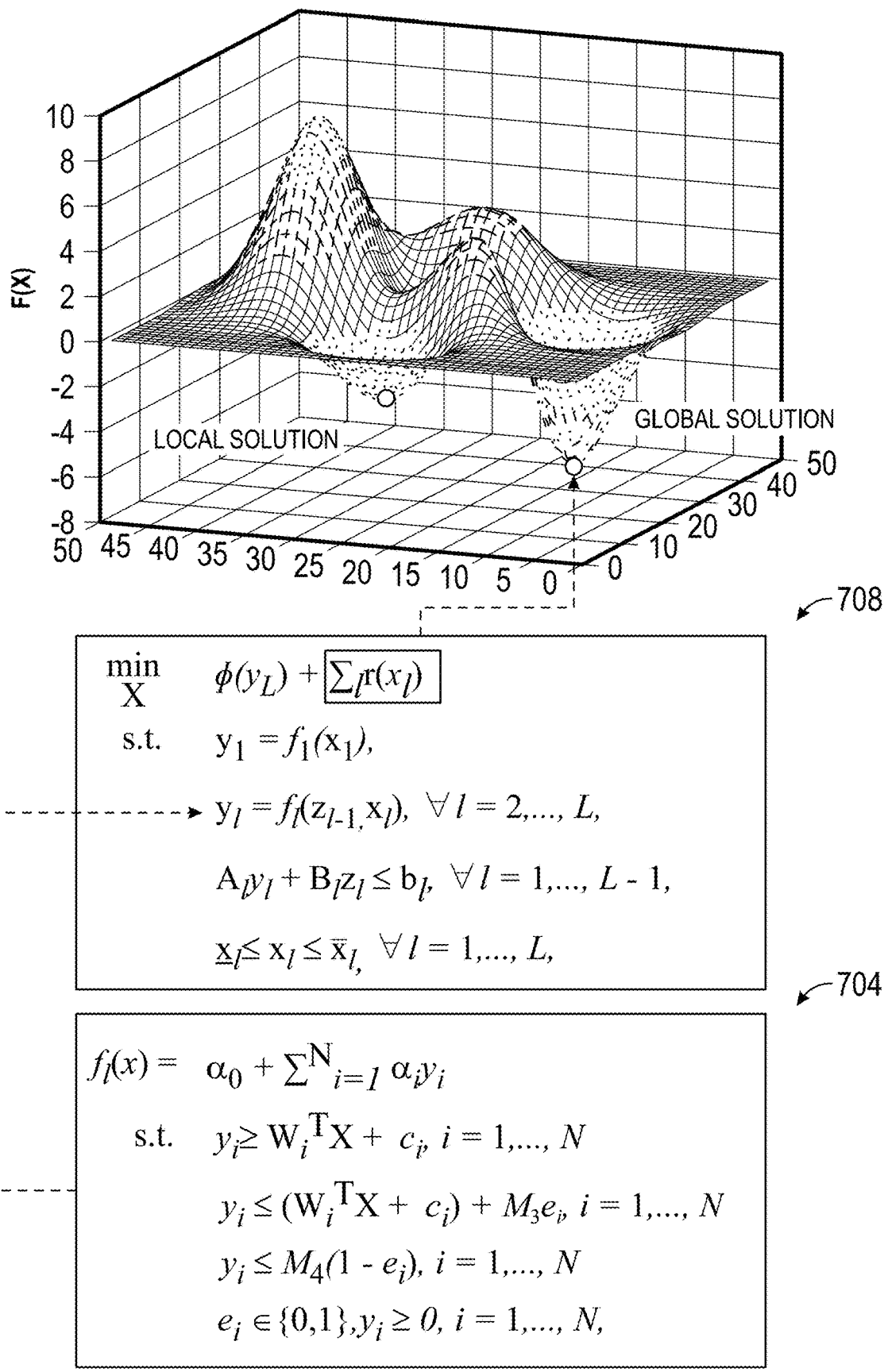
FIG. 7B illustrates an encoding of a prediction uncertainty regularizer r(x) as MILP, in accordance with an example embodiment.

FIG. 7B illustrates an encoding of a prediction uncertainty regularizer $r(x)$ as MILP, in accordance with an example embodiment. As illustrated in FIG. 7B, an exact linear representation 704 is formulated and utilized in the optimization problem 708. The linear representation 704 and the optimization problem 708 of FIG. 7A do not consider the regularizer introduced above for the regression function $f(x)$.

The MILP formulation for the regularizer 712 is $r(x) = \|x - \omega((\varphi(x))\|_1$. Without loss of generality, assume that $h(x) = \omega(\varphi(x))$ is a ReLU deep neural network with K+1 layers, indexed from 0 to K, which is used to model a nonlinear function $h(x): \mathbb{R}^{n_0} \to \mathbb{R}^{n_k}$ with $n_K = n_0$. For each hidden layer $1 \leq k \leq K-1$, the output vector $x_k$ is computed as $x_k = \sigma(W_k x_{k-1} + b_k)$, where $\sigma$ is the ReLU function, $W_k \in \mathbb{R}^{n_k \times n_{k-1}}, b_k \in \mathbb{R}^{n_k}$, and $x_0 = x$. For each layer k, assume there exist constraints $L_k$ and $U_k \in \mathbb{R}_+$ such that $L_k 1_k \leq W_k x_{k-1} + b_k \leq U_k 1_k$, $1_k = \{1, \ldots, 1\}^T \in \mathbb{R}^{n_k}$. The MILP model for $r(x)$ is:

$$x_k - s_k = W_k x_{k-1} + b_k, k=1,\ldots,K-1$$

$$x_k \leq U_k z_k, k=1,\ldots,K-1$$

$$s_k \leq -L_k(1-z_k), k=1,\ldots,K-1$$

$$u - v = x_0 - (W_K x_{K-1} + b_K), u \geq 0, v \geq 0$$

$$r(x) = 1_K^T u + 1_K^T v$$

$$x_k \geq 0, s_k \geq 0, z_k \in \{0,1\}^{n_k}, k=1,\ldots,K-1,$$

where four new variables are introduced $s_k \in \mathbb{R}_+^{n_k}$, $z_k \in \{0,1\}^{n_k}$, $u \in \mathbb{R}_+^{n_K}$, and $v \in \mathbb{R}_+^{n_K}$. The conventional nonlinear representation for $r(x)$ might get a sub-optimal solution. The MILP representation helps to find the global solution for the optimization problem 708 in FIG. 7B.

In one example embodiment, the optimization problem, considering operation efficiency, infeasible inputs, and prediction uncertainty, is formulated as:

$$\min_x \phi(\{x_l, y_l, z_l\}_{l=1}^L) +$$

$$\alpha_1 \left( \sum_{l \in \text{Offline Assets}} c_l^{up^T} v_l + \sum_{l \in \text{Offline Assets}} c_l^{down^T}(1-v_l) \right) +$$

$$\alpha_2 \sum_l (\|\Delta x_l\|_1 + \|\Delta z_l\|_1) + \alpha_3 \sum_l r(x_l)$$

s.t. $f_l(z_{l-1}, x_l) - \overline{y}_l \odot (1-v_l) \leq y_l \leq f_l(z_{l-1}, x_l) - \underline{y}_l \odot (1-v_l)$ $\underline{y}_l \odot v_l \leq y_l \leq \overline{y}_l \odot v_l$ $\underline{y}_l \leq f_l(z_{l-1}, x_l) \leq \overline{y}_l, \forall l = 1, \ldots, L,$ $A_l y_l + B_l z_l \leq b_l, \forall l = 1, \ldots, L-1,$ $(\underline{x}_l - \Delta x_l) v_{l,G} \leq x_l \leq (\overline{x}_l + \Delta x_l) v_{l,G}, \forall l = 1, \ldots, L$ $(\underline{z}_l - \Delta z_l) v_{l-1,G} \leq z_l \leq (\overline{z}_l + \Delta z_l) v_{l-1,G}, \forall l = 1, \ldots, L-1$ $v_l \in \{0,1\}, \forall l = 1, \ldots, L,$ $\Delta x_l \geq 0, \Delta z_l \geq 0,$ where $v_{l-1,G}$ is the scalar related to each component $f_l^i(z_{l-1}, x_l)$, $X = \{x_l, y_l, z_l, v_l, \Delta x_l, \Delta z_l\}_{l=1}^L$. It is noted that $$\left( \sum_{l \in \text{Offline Assets}} c_l^{up^T} v_l + \sum_{l \in \text{Offline Assets}} c_l^{down^T}(1-v_l) \right)$$

represents the start-up/shut-down costs, $\Sigma_l(\|\Delta x_l\|_1 + \|\Delta z_l\|_1)$ represents the operational violation costs, and $\Sigma_l r(x_l)$ represents that predictive uncertainty regularizer. Benefits of the above approach include maintaining the decision point (such as the set-point) close to the historical data, the guarantee of provisioning operating set-points, and the ability to turn off inefficient plants and deploy profitable plants.

Multiple-Period Model for Decision-Making Process

The problem for optimizing control variables over T time periods is considered with some coupling constraints between periods. Two typical operational constraints are introduced and the time index $t \in \{1, \ldots, T\}$ is used for the t-th period model. For some controllable variables, between two consecutive periods, an amount of adjustment should be limited. These ramp-up/down rate limits are modeled as:

$$|x_l^t - x_l^{t+1}| \leq \rho_l \odot x_l^t \quad (5)$$

for some $\rho_l \in [0,1]$ and $l=1, \ldots, L$, $t=1, \ldots, T$. Here $\odot$ denotes the component-wise product. Let $u_l^t$ denote the storage tank levels at time t for the l-th layer. Inventory capacity constraints are written as:

$$u_l^t = u_l^{t-1} + y_l^t - z_l^t, u_l^t \leq \overline{u}_l,$$

$$|u_l^t - u_l^{t-1}| \leq \alpha_l \odot u_l^{t-1} \quad (6)$$

for some $\alpha_l \in [0,1]$, where $\underline{u}_l$ and $\overline{u}_l$ are storage tank limits. A multi-period formulation can be written as:

$$\min_{X^t, u_l^t} \sum_{t=1}^T (\phi^t(y_L^t) + r(X^t)) \quad (7)$$

s.t. $X^t \in x^t,$ $(x_l^t, u_l^t)$ satisfy (5) and (6)

$(l = 1, \ldots, L \; t = 1, \ldots, T),$ where $x^t$ is the set of constraints for the t-th single period problem, and $r(\cdot)$ is the prediction uncertainty regularizer.

Non-Convex Optimization

Figure 8A:
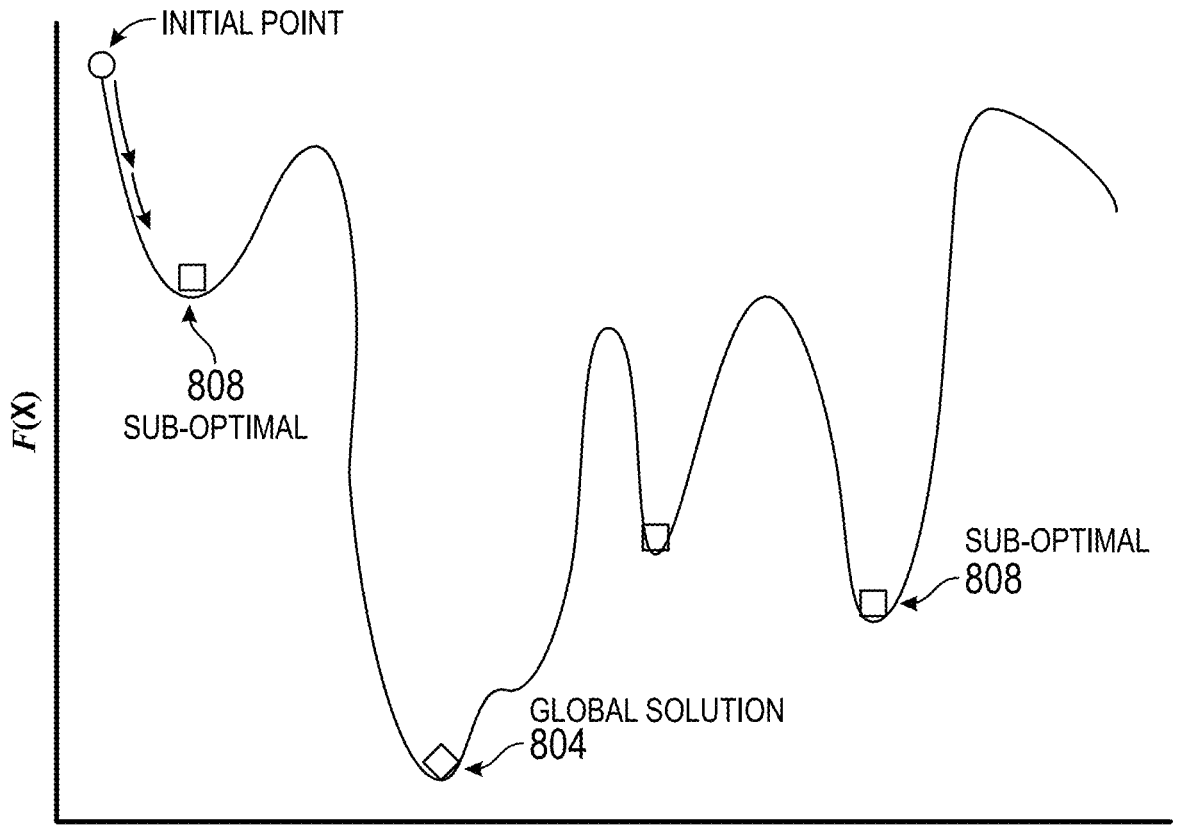
FIG. 8A illustrates a graph of the output, such as throughput, to be minimized vs. the value for a set-point for a highly non-linear function, in accordance with an example embodiment.

FIG. 8A illustrates a graph of the output, such as throughput, (to be minimized) vs. the value for a set-point for a highly non-linear function, in accordance with an example embodiment. Sources of non-convexity include the choice of prediction models and the operational/side constraints. The non-convex optimization increases the difficulty in locating the optimal solution 804; that is, a sub-optimal solution 808 may be found instead.

Figure 8B:
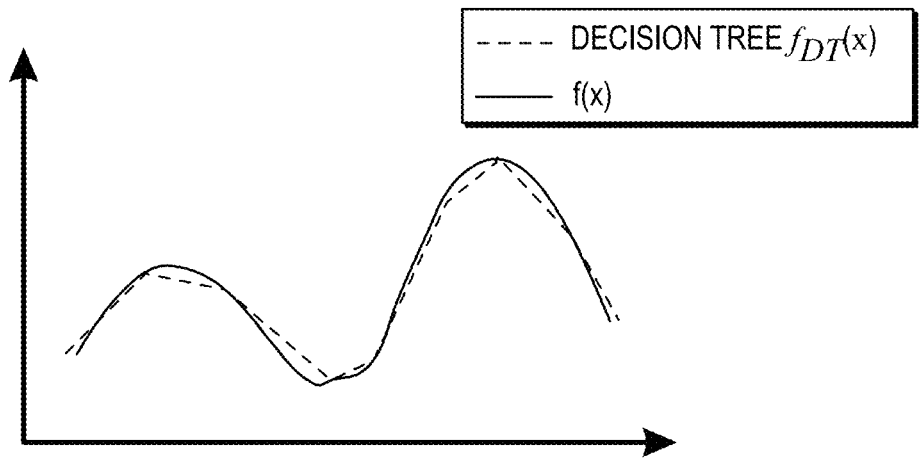
FIG. 8B illustrates the expressive power of decision tree, in accordance with an example embodiment.

FIG. 8B illustrates the expressive power of decision tree, in accordance with an example embodiment. A tree-based regression to learn a nonlinear function is as theoretically powerful as a deep neural network (DNN). A decision tree $f_{DT}(x)$ has the same universal approximation power as a DNN for a general function $f(x)$, i.e., for any $\varepsilon$, there exists $f_{DT}(x)$ such that $|f_{DT}(x)-f(x)| \leq \varepsilon$. A tree-based regression to learn a nonlinear function can be shallow.

Figure 9:
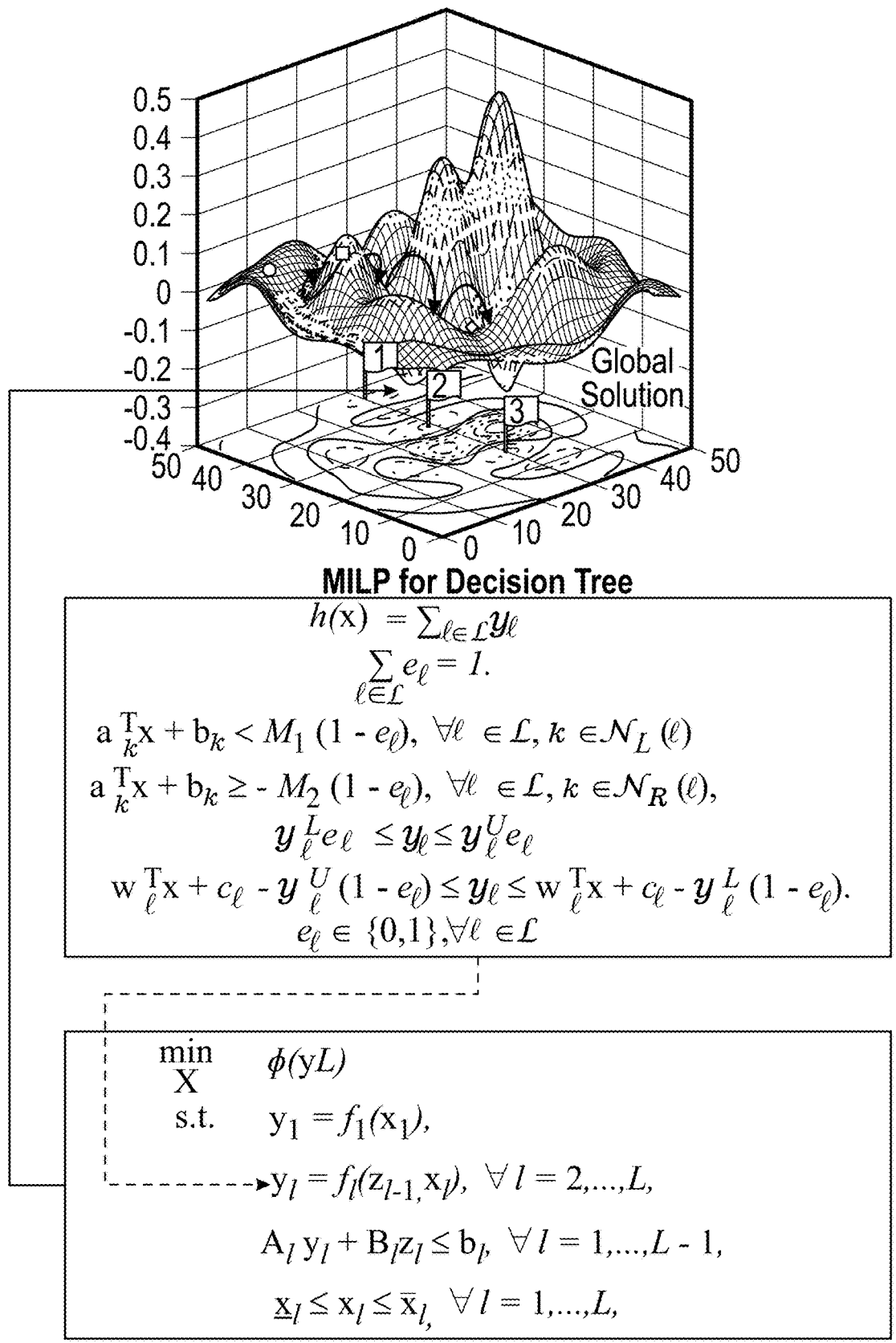
FIG. 9 illustrates an approximation of a regressive function by a piece-wise linear function (such as a decision tree), in accordance with an example embodiment.

FIG. 9 illustrates an approximation of a regressive function by a piece-wise linear function (such as a decision tree, random forest, multivariate adaptive regression spline, multilayer perceptron, and the like), in accordance with an example embodiment. If each regression is a piece-wise linear function, such as a decision tree, MARS, random forest, and ReLU multilayer perceptron, then the global solution 804 can be efficiently found.

Figure 10:
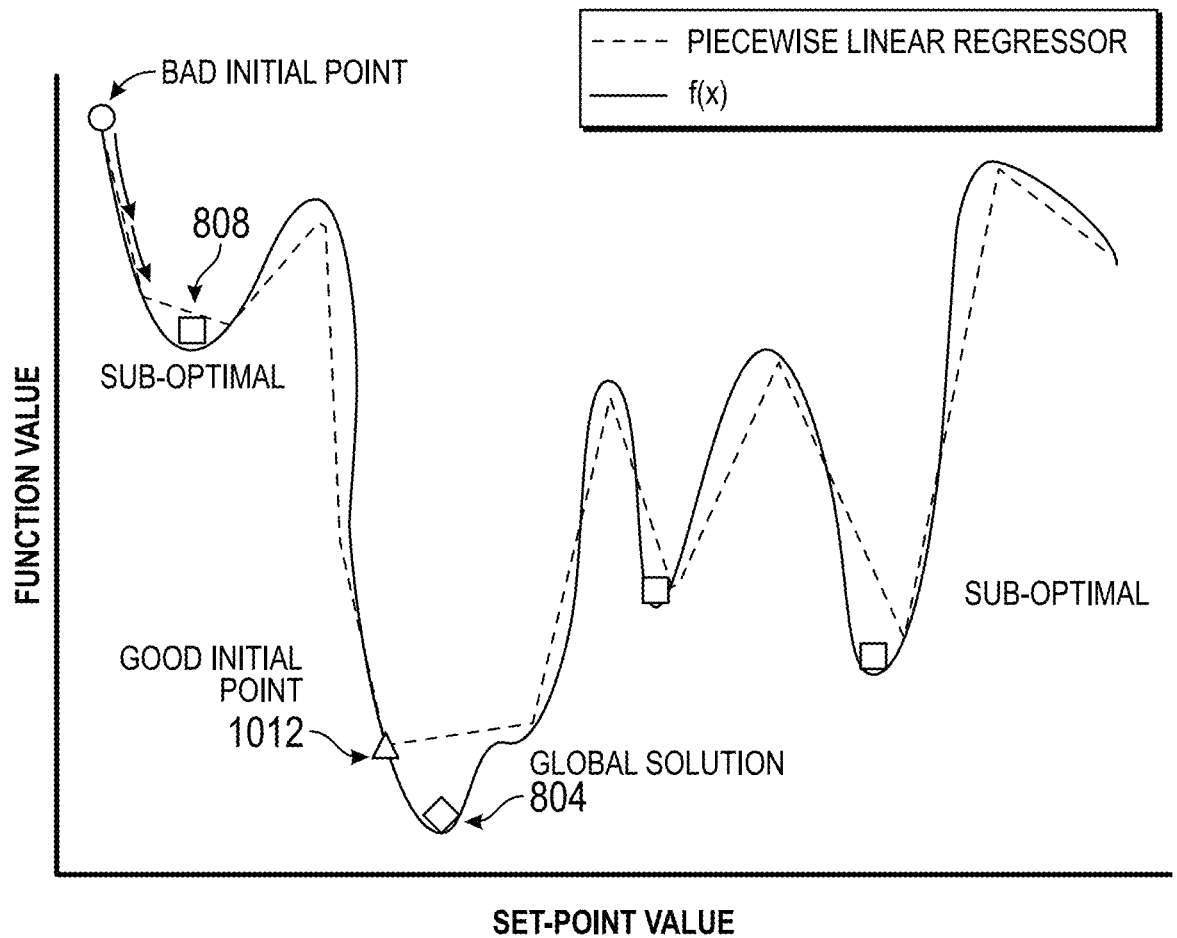
FIG. 10 illustrates a piece-wise linear approximation for an example non-linear function, in accordance with an example embodiment.

FIG. 10 illustrates a piece-wise linear approximation for an example non-linear function, in accordance with an example embodiment. The piece-wise linear regressions are reformulated as mixed-integer linear programs (MILP) and the MILP surrogate is optimized for the nonlinear optimization problem to get an initial solution 1012 for a local search method for solving the original problem 708. Once the best linear approximation is determined, the initial point 1012 may be utilized to locate the optimal solution 804; that is, use the initial point 1012 from MILP as a starting point for the local algorithm to solve the original non-convex model to get the optimal solution 804.

The global solution may be found using, for example, a piece-wise linear approximation to guide the local search. In one example embodiment, if the function $f(x)$ cannot be linearized, a piece-wise linear model is selected, such as decision tree, random forest, MARS, feedforward neural network (FFN), and the like, with the highest accuracy generated by an automated machine learning system. The piece-wise linear regressions are reformulated as mixed-integer linear programs (MILP). The MILP surrogate is optimized for the nonlinear optimization problem to get an optimal solution (the point 1012) for the piece-wise linear function. The optimal solution of the piece-wise linear function (the point 1012) from MILP is used as a starting point for the local algorithm to solve the original non-convex model to obtain the global solution (the point 804).

Architecture

Figure 11:
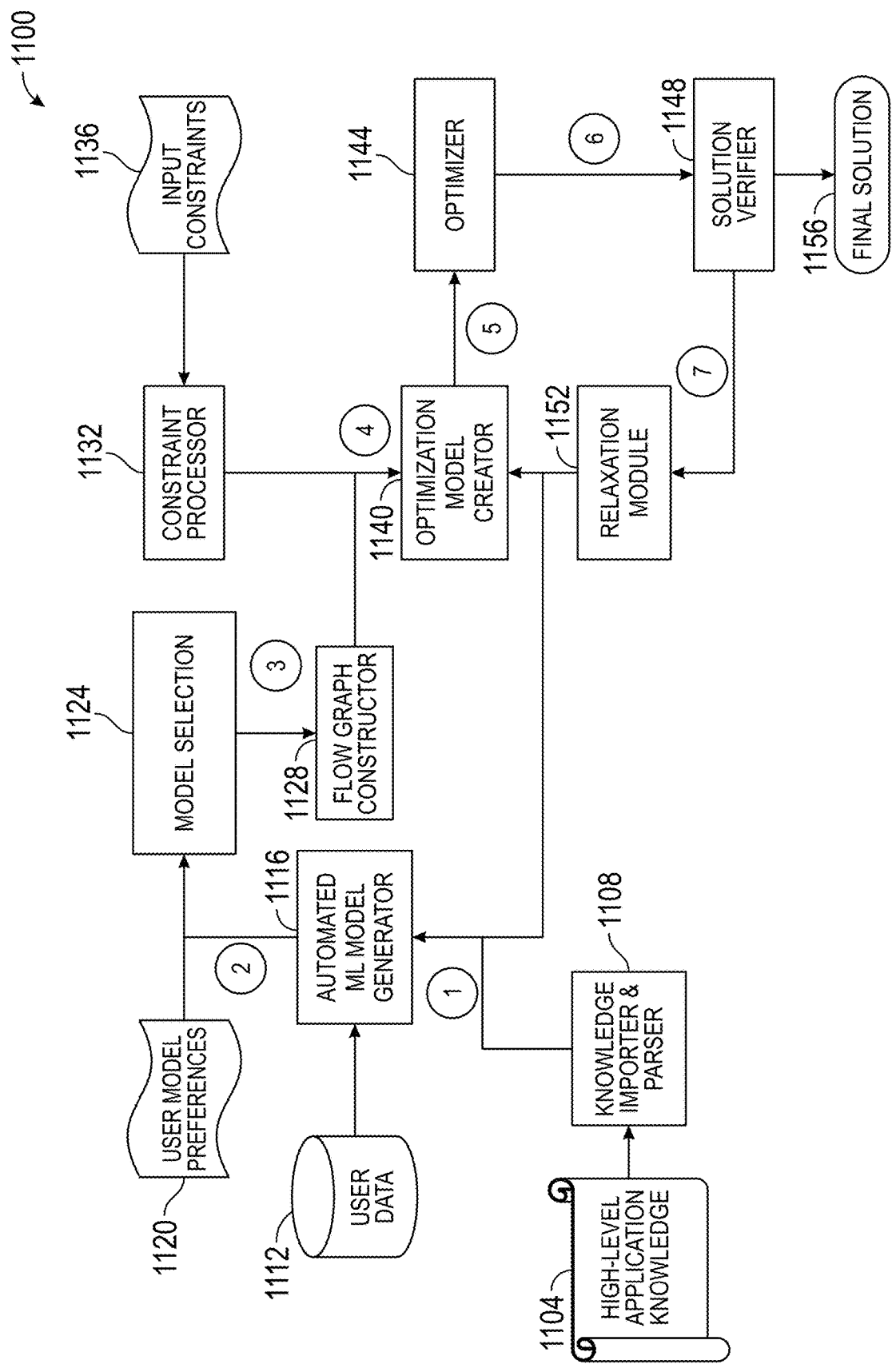
FIG. 11 is a block diagram for an example industrial processing system, in accordance with an example embodiment.

FIG. 11 is a block diagram for an example industrial processing system 1100, in accordance with an example embodiment. A knowledge importer and parser 1108 processes high-level application knowledge from a database 1104 (for example, historical data regarding the relationship between the input to and set-point of each process 104-1, 104-2, 104-3, 104-4, 104-5, 104-6, 104-7 and the output of the corresponding process 104-1, 104-2, 104-3, 104-4, 104-5, 104-6, 104-7, output variables and relevant input variables, time-window for the historical sensor data, features for use by the machine learning algorithm, and the like) In one example embodiment, the knowledge importer and parser 1108 includes a user interface that, for example, enables a user to input the historical data, control variables, and the like. The skilled artisan will be familiar with high-level languages like python and other languages suitable for parsers, and will be familiar with user interfaces such as graphical user interfaces based on hypertext markup language and the like.

The automated machine learning model generator 1116 uses historical data that relates the output of the corresponding process 104-1, 104-2, 104-3, 104-4, 104-5, 104-6, 104-7 to the corresponding input and set-point to derive, for example, the regression functions for each process 104-1, 104-2, 104-3, 104-4, 104-5, 104-6, 104-7. In one example embodiment, the automated machine learning model generator 1116 also considers historical data, pre-specified controllable and uncontrollable variables, and the like. The automated machine learning model generator 1116 can be implemented using any suitable machine learning system, such as linear regression, decision tree, deep neural network, and the like. Model selection 1124 chooses the best models, for example, the most accurate models, the model with the shortest running time, and the like, based on user model preferences 1120. For example, if a determination of the set-points is desired within a short amount of time (such as within two minutes), a model with a shorter running time, such as a decision tree model, may be selected. In one example embodiment, different machine learning models are generated for use in the industrial processing system 1100 and a comparison of the accuracy of the machine learning models is performed based on the accuracy indicators obtained from the automated machine learning model generator 1116. The flow graph constructor 1128 encodes the process flow diagram 100 into the graphical representation 150. The skilled artisan will be familiar with computer-aided design systems and other applications suitable for constructing graphs such as the graphical representation 150. Furthermore in this regard, as will be appreciated by the skilled artisan, examples of CAD software of use in various aspects of the chemical process, extraction, and refining industries include CHEMCAD® (registered mark of CHEMCAD LLC FLORHAM PARK NEW JERSEY), MATLAB® (registered mark of THE MATHWORKS INC. NATICK MASSACHUSETTS), AUTOCAD® (registered mark of AUTODESK, INC. San Rafael CALIFORNIA), and the like.

Input constraints 1136, such as a temperature constraint $\underline{x}_l \leq x_l \leq \overline{x}_l$ represented by a range $(\underline{x}_l - \Delta x_l) v_{l,G} \leq x_l \leq (\overline{x}_l + \Delta x_l) v_{l,G} \forall l = 1, \ldots, L$, are parsed by a constraint processor 1132 to, for example, reformat the constraints in a format compatible with the optimizer 1144. The parsed input constraints, the process flow diagram 100, and the generated machine learning models are utilized by an optimization model creator 1140 to create the optimization model. The optimization model creator 1140 can be implemented in software by solving the disclosed optimization equations using computer code written in a high-level language and compiled or interpreted into machine-level code. An optimizer 1144 utilizes the optimization model to generate a solution, such as the set-points for the process 104-1, 104-2, 104-3, 104-4, 104-5. The skilled artisan will be familiar with optimizers suitable for generating a solution based on the optimization model. A solution verifier 1148 displays the optimizer results to a user, who may provide guidance to the relaxation module 1152 for revising the industrial processing system 1100. For example, a relaxation of one or more input constraints may be provided by the user to the relaxation module 1152. The relaxation module 1152 then triggers the generation of a revised optimization model via the optimization model creator 1140, the generation of a revised model via the automated machine learning model generator 1116, or both. Once a user approves the results displayed by the solution verifier 1148, the final solution 1156, including the optimization model and set-points, is provided.

Given the discussion thus far, it will be appreciated that, in general terms, an exemplary computer-implemented method, according to an aspect of the invention, includes the operations of learning, using machine learning, a relationship between an input and a set-point of a plurality of processes 104-1, 104-2, 104-3, 104-4, 104-5, 104-6, 104-7 and an output of a corresponding process 104-1, 104-2, 104-3, 104-4, 104-5, 104-6, 104-7; deriving a regression function for each process 104-1, 104-2, 104-3, 104-4, 104-5, 104-6, 104-7 based upon historical data; training an autoencoder for each process 104-1, 104-2, 104-3, 104-4, 104-5, 104-6, 104-7 based upon the historical data to form a regularizer; merging the regression functions and regularizers together into a unified optimization problem 340; performing system level optimization using the regression functions and regularizers (operation 412); determining a set of optimal set-points of a global optimal solution for operating the processes 104-1, 104-2, 104-3, 104-4, 104-5, 104-6, 104-7 (operation 416); and (optionally) operating an industrial system 100 based on the set of optimal set-points (examples include extracting crude oil, refining crude oil, operating chemical process equipment, and the like). Alternatively, the set of optimal set-points can be provided to an entity that then operates the system accordingly.

In one aspect, an apparatus comprises a memory and at least one processor, coupled to the memory, and operative to perform operations comprising learning, using a machine learning model generator 1116, a relationship between an input and a set-point of a plurality of processes 104-1, 104-2, 104-3, 104-4, 104-5, 104-6, 104-7 and an output of a corresponding process 104-1, 104-2, 104-3, 104-4, 104-5, 104-6, 104-7; deriving, using the machine learning model generator 1116, a regression function for each process 104-1, 104-2, 104-3, 104-4, 104-5, 104-6, 104-7 based upon historical data; training an autoencoder of an optimization model creator 1140 for each process 104-1, 104-2, 104-3, 104-4, 104-5, 104-6, 104-7 based upon the historical data to form a regularizer; merging, using the optimization model creator 1140, the regression functions and regularizers together into a unified optimization problem 340; performing, using an optimizer 1144, system level optimization using the regression functions and regularizers (operation 412); determining, using the optimizer 1144, a set of optimal set-points of a global optimal solution for operating the processes 104-1, 104-2, 104-3, 104-4, 104-5, 104-6, 104-7 (operation 416); and operating an industrial system 100 based on the set of optimal set-points.

In one aspect, a computer program product comprises a computer readable storage medium having program instructions embodied therewith, the program instructions executable by a computer to cause the computer to perform operations comprising learning, using machine learning, a relationship between an input and a set-point of a plurality of processes 104-1, 104-2, 104-3, 104-4, 104-5, 104-6, 104-7 and an output of a corresponding process 104-1, 104-2, 104-3, 104-4, 104-5, 104-6, 104-7; deriving a regression function for each process 104-1, 104-2, 104-3, 104-4, 104-5, 104-6, 104-7 based upon historical data; training an autoencoder for each process 104-1, 104-2, 104-3, 104-4, 104-5, 104-6, 104-7 based upon the historical data to form a regularizer; merging the regression functions and regularizers together into a unified optimization problem 340; performing system level optimization using the regression functions and regularizers (operation 412); determining a set of optimal set-points of a global optimal solution for operating the processes 104-1, 104-2, 104-3, 104-4, 104-5, 104-6, 104-7 (operation 416); and operating an industrial system 100 based on the set of optimal set-points.

In one example embodiment, the machine learning is based on historical data that relates the output of each process 104-1, 104-2, 104-3, 104-4, 104-5, 104-6, 104-7 to the corresponding input and set-point.

In one example embodiment, learning the relationship comprises ingesting the historical data for each process 104-1, 104-2, 104-3, 104-4, 104-5, 104-6, 104-7; and performing feature engineering for each process 104-1, 104-2, 104-3, 104-4, 104-5, 104-6, 104-7 (operation 404), wherein the learning of the relationship is based on results of the feature engineering (operation 408).

In one example embodiment, the unified optimization problem is defined with regularizer terms, wherein each regularizer term is generated by an autoencoder.

In one example embodiment, highly efficient processes are identified to deploy with a binary variable $v_l$ for each of the highly efficient processes 104-1, 104-2, 104-3, 104-4, 104-5, wherein a value of the binary variable vl indicates an enablement state of the corresponding process 104-1, 104-2, 104-3, 104-4, 104-5, and wherein start-up and shut-down costs of the corresponding process 104-1, 104-2, 104-3, 104-4, 104-5 are added in the unified optimization problem by a cost term:

$$\sum_{l \in \text{ Offline Assets}} c_l^{up^T} v_l + \sum_{l \in \text{ Offline Assets}} c_l^{down^T} (1 - v_l).$$

In one example embodiment, in response to determining that the set of optimal set-points are unsatisfactory, an original constraint on $x_l$ defined by $(\underline{x}_l) v_{l,G} \leq x_l \leq (\overline{x}_l) v_{l,G}$ $\forall l=1, \ldots, L$ is relaxed by defining a range $(\underline{x}_l - \Delta x_l) v_{l,G} \leq x_l \leq (\overline{x}_l + \Delta x_l) v_{l,G}$, $\forall l=1, \ldots, L$, to locate the set-point under constrained conditions.

In one example embodiment, a piece-wise linear model is used for each regression function to determine an initial set-point, wherein the determining the set of optimal set-points utilizes the initial set-point as a starting point.

In one example embodiment, a regularizer 712 for the optimization problem is defined as $r(x)=\|x-\omega(\varphi(x))\|_1$, and the regularizer 712 is linearized to find the global optimal solution, wherein a model for r(x) is:

$$x_k - s_k = W_k x_{k-1} + b_k, k=1, \ldots, K-1$$

$$x_k \leq U_k z_k, k=1, \ldots, K-1$$

$$s_k \leq -L_k(1-z_k), k=1, \ldots, K-1$$

$$u - v = x_0 - (W_K x_{K-1} + b_K), u \geq 0, v \geq 0$$

$$r(x) = 1_K^T u + 1_K^T v$$

$$x_k \geq 0, s_k \geq 0, z_k \in \{0,1\}^{n_k}, k=1, \ldots, K-1,$$

In one example embodiment, the unified optimization problem is formulated considering prediction uncertainty, operation efficiency, and relaxing operation limits as:

$$\min_x \phi\left(\{x_l, y_l, z_l\}_{l=1}^L\right) + \alpha_1 \left(\sum_{l \in \text{ Offline Assets}} c_l^{up^T} v_l + \sum_{l \in \text{ Offline Assets}} c_l^{down^T} (1 - v_l)\right) + \alpha_2 \sum_l (\|\Delta x_l\|_1 + \|\Delta z_l\|_1) + \alpha_3 \sum_l r(x_l)$$

-continued s.t. $f_l(z_{l-1}, x_l) - \bar{y}_l \odot (1-v_l) \le y_l \le f_l(z_{l-1}, x_l) - \underline{y}_l \odot (1-v_l)$ $\underline{y}_l \odot v_l \le y_l \le \bar{y}_l \odot v_l$ $\underline{y}_l \le f_l(z_{l-1}, x_l) \le \bar{y}_l, \forall l = 1, \ldots, L,$ $A_l y_l + B_l z_l \le b_l, \forall l = 1, \ldots, L-1,$ $(\underline{x}_l - \Delta x_l)v_{l,G} \le x_l \le (\bar{x}_l + \Delta x_l)v_{l,G}, \forall l = 1, \ldots, L$ $(\underline{z}_l - \Delta z_l)v_{l-1,G} \le z_l \le (\bar{z}_l + \Delta z_l)v_{l-1,G}, \forall l = 1, \ldots, L-1$ $v_l \in \{0, 1\}, \forall l = 1, \ldots, L,$ $\Delta x_l \ge 0, \Delta z_l \ge 0,$ wherein $v_{l-1,G}$ is a scalar related to each component $\beta_l^i(z_{l-1}, x_l)$, $X = \{x_l, y_l, z_l, v_l, \Delta x_l, \Delta z_l\}_{l=1}^L$.

In one example embodiment, the piece-wise linear model is selected; piece-wise linear regressions are reformulated as mixed-integer linear programs to generate an initial solution; the reformulated mixed-integer linear programs are optimized to generate an initial solution 1012; and wherein the determining the set of optimal set-points utilizes the initial solution from the mixed-integer linear program as the starting point for a local search method to locate the global optimal solution of the unified optimization problem. In one example embodiment, the local search method is the augmented Lagrangian method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
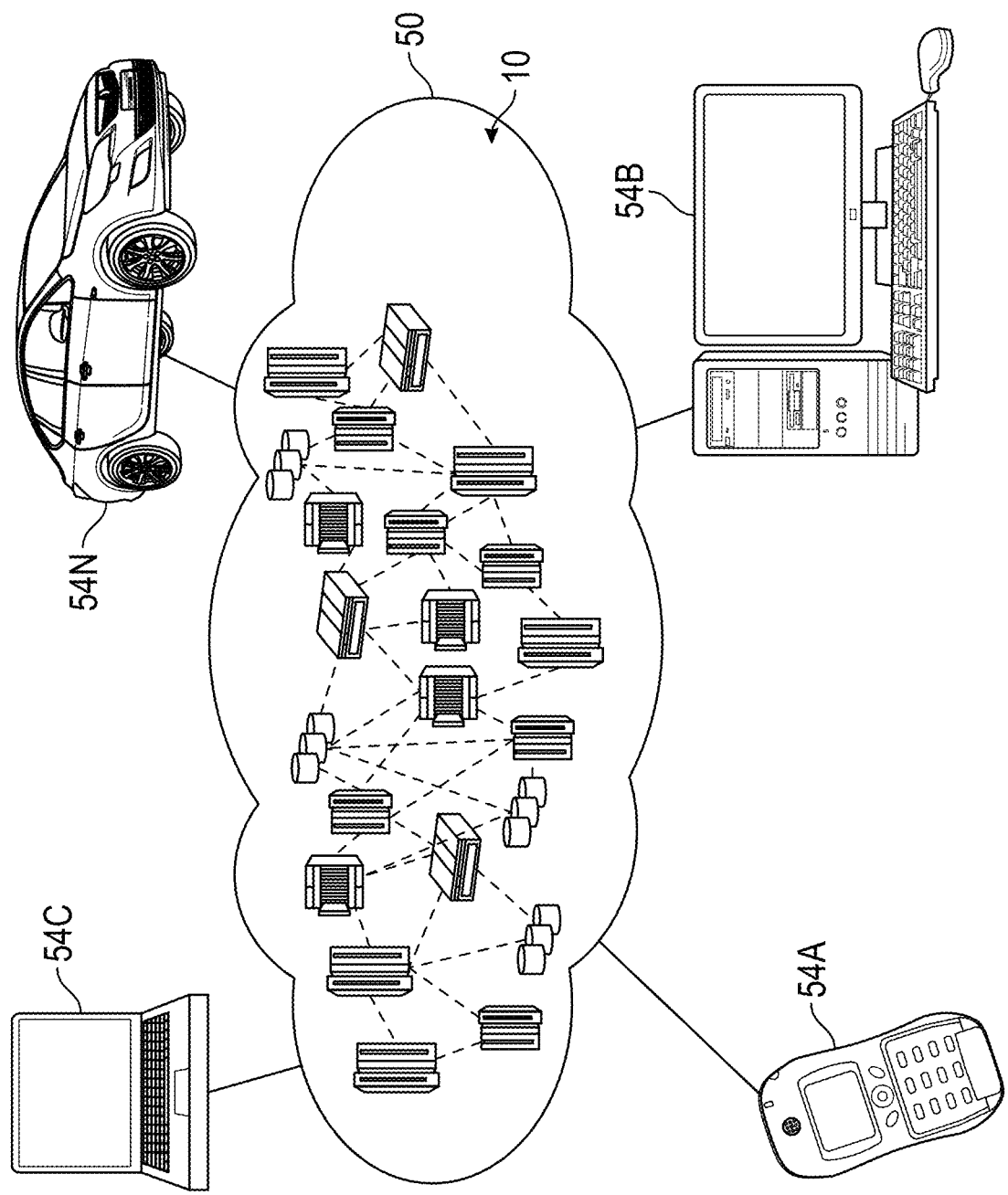
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
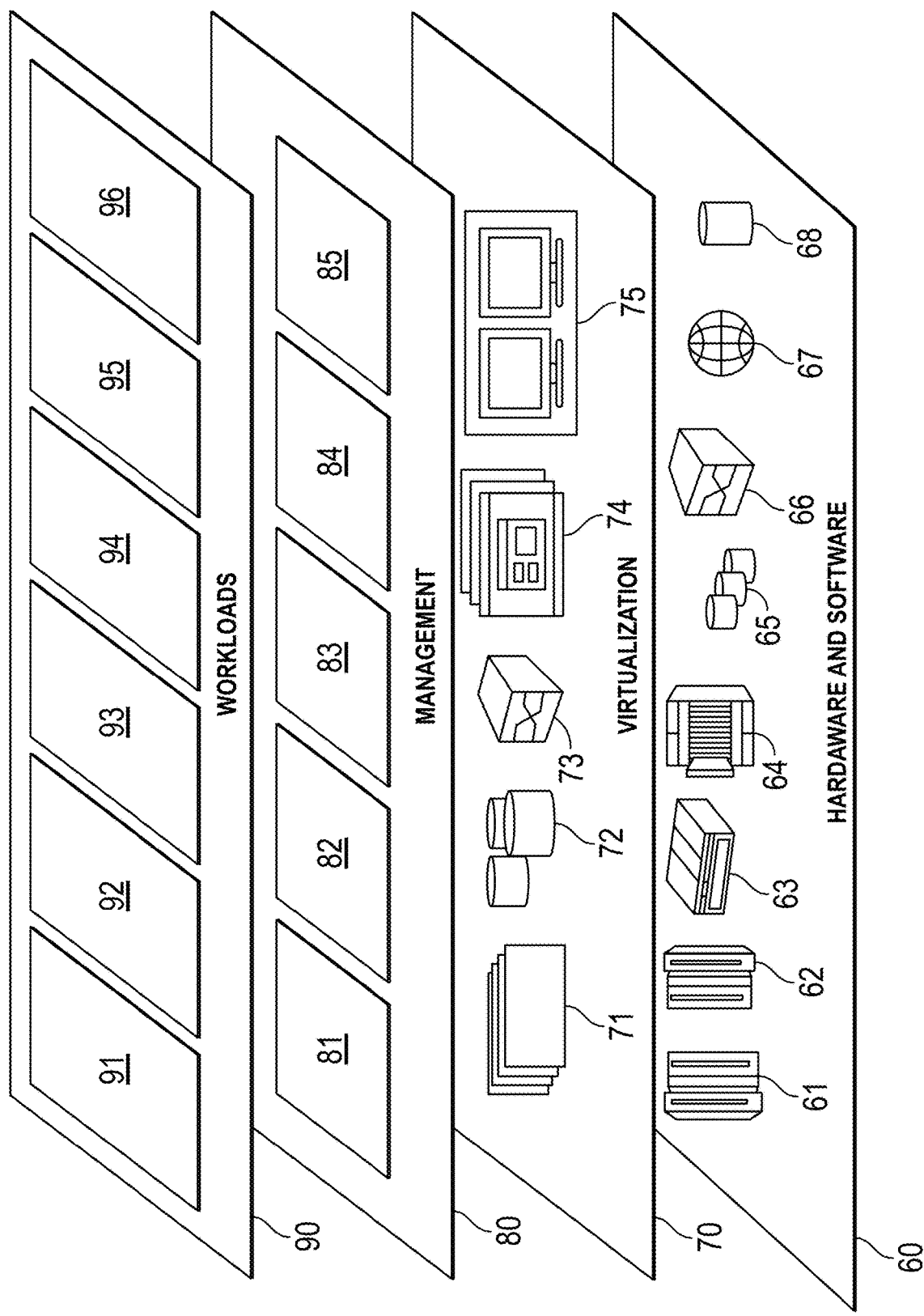
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of an industrial processing system 96.

Figure 14:
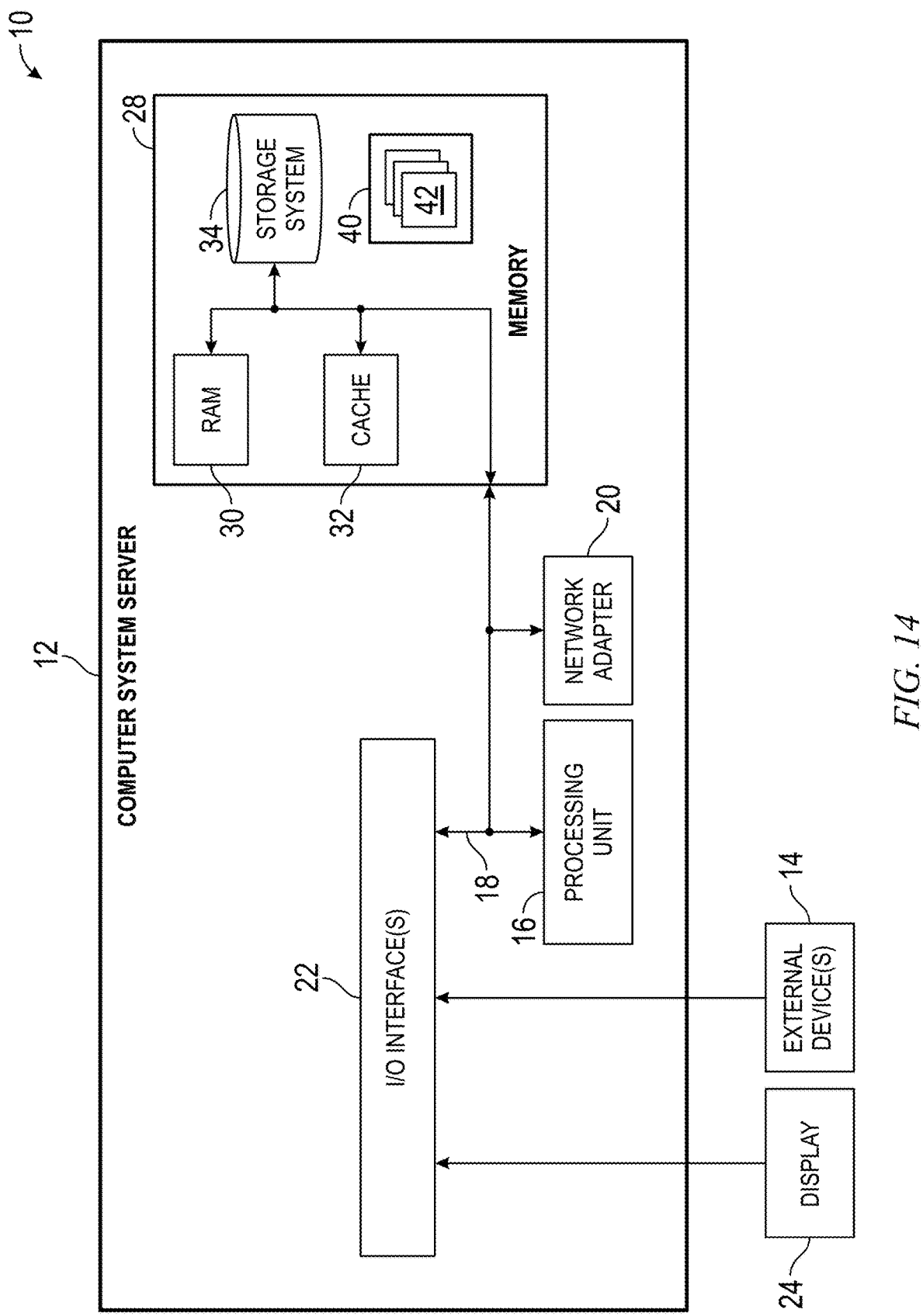
FIG. 14 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 14 depicts a computer system that may be useful in implementing one or more aspects and/or elements of the invention, also representative of a cloud computing node according to an embodiment of the present invention. Referring now to FIG. 14, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 14, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 14) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 12-13 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   learning, using machine learning, a relationship between an input and a set-point of a plurality of processes and an output of a corresponding process;
   deriving a regression function for each process based upon historical data;
   training an autoencoder for each process based upon the historical data to form a regularizer;
   merging the regression functions and regularizers together into a unified optimization problem;
   performing system level optimization using the regression functions and regularizers;
   determining a set of optimal set-points of a global optimal solution for operating the processes; and
   operating an industrial system based on the set of optimal set-points.

2. The computer-implemented method of claim 1, wherein the machine learning is based on historical data that relates the output of each process to the corresponding input and set-point.

3. The computer-implemented method of claim 1, wherein the learning the relationship comprises:
   ingesting the historical data for each process; and
   performing feature engineering for each process, wherein the learning of the relationship is based on results of the feature engineering.

4. The computer-implemented method of claim 1, further comprising defining the unified optimization problem with regularizer terms, wherein each regularizer term is generated by an autoencoder.

5. The computer-implemented method of claim 1, further comprising identifying highly efficient processes to deploy with a binary variable vl for each of the highly efficient processes, wherein a value of the binary variable vl indicates an enablement state of the corresponding process and wherein start-up and shut-down costs of the corresponding process are added in the unified optimization problem by a cost term:

$$\sum_{l \in \text{Offline Assets}} c_l^{up^T} v_l + \sum_{l \in \text{Offline Assets}} c_l^{down^T} (1 - v_l).$$

6. The computer-implemented method of claim 1, further comprising relaxing, in response to determining that the set of optimal set-points are unsatisfactory, an original constraint on $x_l$ defined by $(\underline{x}_l)v_{l,G} \leq x_l \leq (\overline{x}_l)v_{l,G}$, $\forall l=1, \ldots, L$ by defining a range $(\underline{x}_l - \Delta x_l)v_{l,G} \leq x_l \leq (\overline{x}_l + \Delta x_l)v_{l,G}$, $\forall l=1, \ldots, L$, to locate the set-point under constrained conditions.

7. The computer-implemented method of claim 1, further comprising using a piece-wise linear model for each regression function to determine an initial set-point, wherein the determining the set of optimal set-points utilizes the initial set-point as a starting point.

8. The computer-implemented method of claim 7, further comprising:
   selecting the piece-wise linear model;
   reformulating piece-wise linear regressions as mixed-integer linear programs;
   optimizing the reformulated mixed-integer linear programs to generate an initial solution; and
   wherein the determining the set of optimal set-points utilizes the initial solution from the mixed-integer linear program as the starting point for a local search method to locate the global optimal solution of the unified optimization problem.

9. The computer-implemented method of claim 1, further comprising defining a regularizer for the optimization problem as $r(x) = \|x - \omega(\varphi(x))\|_1$, and linearizing the regularizer to find the global optimal solution, wherein a model for $r(x)$ is:

$$x_k - s_k = W_k x_{k-1} + b_k, k=1, \ldots, K-1$$

$$x_k \leq U_k z_k, k=1, \ldots, K-1$$

$$s_k \leq -L_k(1 - z_k), k=1, \ldots, K-1$$

$$u - v = x_0 - (W_K x_{K-1} + b_K), u \geq 0, v \geq 0$$

$$r(x) = 1_K^T u + 1_K^T v$$

$$x_k \geq 0, s_k \geq 0, z_k \in \{0,1\}^{nk}, k=1, \ldots, K-1,$$

10. The computer-implemented method of claim 1, further comprising formulating the unified optimization problem considering prediction uncertainty, operation efficiency, and relaxing operation limits as:

$$\min_x \phi(\{x_l, y_l, z_l\}_{l=1}^L) +$$

$$\alpha_1 \left( \sum_{l \in \text{Offline Assets}} c_l^{up^T} v_l + \sum_{l \in \text{Offline Assets}} c_l^{down^T} (1 - v_l) \right) +$$

$$\alpha_2 \sum_l (\|\Delta x_l\|_1 + \|\Delta z_l\|_1) + \alpha_3 \sum_l r(x_l)$$

s.t. $f_l(z_{l-1}, x_l) - \overline{y}_l \odot (1 - v_l) \leq y_l \leq f_l(z_{l-1}, x_l) - \underline{y}_l \odot (1 - v_l)$ $\underline{y}_l \odot v_l \leq y_l \leq \overline{y}_l \odot v_l$ $\underline{y}_l \leq f_l(z_{l-1}, x_l) \leq \overline{y}_l, \forall l = 1, \ldots, L,$ $A_l y_l + B_l z_l \leq b_l, \forall l = 1, \ldots, L-1,$ $(\underline{x}_l - \Delta x_l)v_{l,G} \leq x_l \leq (\overline{x}_l + \Delta x_l)v_{l,G}, \forall l = 1, \ldots, L$ $(\underline{z}_l - \Delta z_l)v_{l-1,G} \leq z_l \leq (\overline{z}_l + \Delta z_l)v_{l-1,G}, \forall l = 1, \ldots, L-1$ $v_l \in \{0, 1\}, \forall l = 1, \ldots, L,$ $\Delta x_l \geq 0, \Delta z_l \geq 0,$ wherein $v_{l-1,G}$ is a scalar related to each component $f_l^i(z_{l-1}, x_l)$, $X = \{x_l, y_l, z_l, \underline{y}_l, \Delta x_l, \Delta z_l\}_{l=1}^L$.

11. An apparatus comprising:
   a memory; and
   at least one processor, coupled to said memory, and operative to perform operations comprising:
      instantiating a machine learning model generator, an optimization model creator having an autoencoder, and an optimizer;
      learning, using the machine learning model generator, a relationship between an input and a set-point of a plurality of processes and an output of a corresponding process;

deriving, using the machine learning model generator, a regression function for each process based upon historical data;

training the autoencoder of the optimization model creator for each process based upon the historical data to form a regularizer;

merging, using the optimization model creator, the regression functions and regularizers together into a unified optimization problem;

performing, using the optimizer, system level optimization using the regression functions and regularizers;

determining, using the optimizer, a set of optimal set-points of a global optimal solution for operating the processes; and operating an industrial system based on the set of optimal set-points.

12. The apparatus of claim 11, wherein the machine learning is based on historical data that relates the output of each process to the corresponding input and set-point.

13. The apparatus of claim 11, wherein learning the relationship comprises:

ingesting the historical data for each process; and performing feature engineering for each process, wherein the learning of the relationship is based on results of the feature engineering.

14. The apparatus of claim 11, the operations further comprising defining the unified optimization problem with regularizer terms, wherein each regularizer term is generated by an autoencoder.

15. The apparatus of claim 11, the operations further comprising identifying highly efficient processes to deploy with a binary variable vl for each of the highly efficient processes, wherein a value of the binary variable vl indicates an enablement state of the corresponding process and wherein start-up and shut-down costs of the corresponding process are added in the unified optimization problem by a cost term:

$$\sum_{l \in \text{Offline Assets}} c_l^{up^T} v_l + \sum_{l \in \text{Offline Assets}} c_l^{down^T} (1 - v_l).$$

16. The apparatus of claim 11, the operations relaxing, in response to determining that the set of optimal set-points are unsatisfactory, an original constraint on xl defined by $(\underline{x}_l) v_{l,G} \leq x_l \leq (\overline{x}_l) v_{l,G}, \forall l=1, \ldots, L$ by defining a range $(\underline{x}_l - \Delta x_l)(\overline{x}_l) v_{l,G} \leq x_l \leq (\overline{x}_l) v_{l,G}, \forall l=1, \ldots, L$ to locate the set-point under constrained conditions.

17. The apparatus of claim 11, the operations further comprising using a piece-wise linear model for each regression function to determine an initial set-point, wherein the determining the set of optimal set-points utilizes the initial set-point as a starting point.

18. The apparatus of claim 17, the operations further comprising:

selecting the piece-wise linear model;

reformulating piece-wise linear regressions as mixed-integer linear programs;

optimizing the reformulated mixed-integer linear programs to generate an initial solution; and wherein the determining the set of optimal set-points utilizes the initial solution from the mixed-integer linear program as the starting point for a local search method locate the global optimal solution of the unified optimization problem.

19. The apparatus of claim 11, the operations further comprising defining a regularizer for the optimization problem as $r(x)=\|x-\omega(\varphi(x))\|_1$, and linearizing the regularizer to find the global optimal solution, wherein a model for r(x) is:

$$x_k - s_k = W_k x_{k-1} + b_k, k=1, \ldots, K-1$$

$$x_k \leq U_k z_k, k=1, \ldots, K-1$$

$$s_k \leq -L_k(1-z_k), k=1, \ldots, K-1$$

$$u - v = x_0 - (W_K x_{K-1} + b_K), u \geq 0, v \geq 0$$

$$r(x) = 1_K^T u + 1_K^T v$$

$$x_k \geq 0, s_k \geq 0, z_k \in \{0,1\}^{n_k}, k=1, \ldots, K-1,$$

20. A computer program product, the computer program product comprising a computer readable storage medium having program instructions embodied therewith, the program instructions executable by a computer to cause the computer to perform operations comprising:

learning, using machine learning, a relationship between an input and a set-point of a plurality of processes and an output of a corresponding process;

deriving a regression function for each process based upon historical data;

training an autoencoder for each process based upon the historical data to form a regularizer;

merging the regression functions and regularizers together into a unified optimization problem;

performing system level optimization using the regression functions and regularizers; and determining a set of optimal set-points of a global optimal solution for operating the processes; and operating an industrial system based on the set of optimal set-points.

* * * * *